(12) United States Patent
Bornhurst et al.

(10) Patent No.: US 9,817,142 B2
(45) Date of Patent: Nov. 14, 2017

(54) SYSTEM AND METHOD FOR ANALYZING GEOLOGIC FEATURES USING SEISMIC DATA

(71) Applicants: John Jerome Bornhurst, West Perth (AU); James Robert Magill, East Perth (AU)

(72) Inventors: John Jerome Bornhurst, West Perth (AU); James Robert Magill, East Perth (AU)

(73) Assignee: CHEVRON U.S.A. INC., San Ramon, CA (US)

( * ) Notice: Subject to any disclaimer, the term of this patent is extended or adjusted under 35 U.S.C. 154(b) by 414 days.

(21) Appl. No.: 14/597,957

(22) Filed: Jan. 15, 2015

(65) Prior Publication Data

US 2016/0209531 A1 Jul. 21, 2016

(51) Int. Cl.
*G01V 1/30* (2006.01)
*G01V 1/28* (2006.01)

(52) U.S. Cl.
CPC ............ *G01V 1/307* (2013.01); *G01V 1/282* (2013.01); *G01V 2210/632* (2013.01); *G01V 2210/665* (2013.01)

(58) Field of Classification Search
None
See application file for complete search history.

(56) References Cited

U.S. PATENT DOCUMENTS 5,862,100 A  1/1999 Verwest

2005/0207278 A1* 9/2005 Reshef .................. G01V 1/362
367/38
2009/0192718 A1  7/2009 Zhang et al.

OTHER PUBLICATIONS

J. J. Silva, et al., "Controlled Seismic Imaging in Determining AVA Curves under Shallow Complex Structures" Near Surface 2010, 16th European Meeting of Environmental and Engineering Geophysics, Zurich, Switzerland, 5 pgs.
Yong Xu, et al., Benefiting from 3D AVO by Using Adaptive Supergathers, The Leading Edge, pp. 1544-1547, Dec. 2007.
Houck R. T., et al., "Quantifying the uncertainty in an AVO interpretation", Geophysics Society of Exploration Geophysics, Feb. 1, 2002, vol. 67, No. 1, pp. 117-125.
Thompson, P., et al. "Distinguishing gas san from shale/brine sand using elastic impedance data and the determination of the lateral extent of channel reservoirs using amplitude data for a channelized deepwater gas field in Indonesia" The Leading Edge, Society of Exploration Geophysicists, Mar. 1, 2009, pp. 312-317.
PCT Notification of Transmittal of the International Search Report and the Written Opinion of the International Searching Authority, or the Declaration, dated Jun. 5, 2015, 11 pages.
PCT International Preliminary Report on Patentability, International Application No. PCT/US2015/016828, dated Nov. 17, 2016.

* cited by examiner

*Primary Examiner* — Tung Lau
(74) *Attorney, Agent, or Firm* — Jesse Salen; Ben Esplin; Marie L. Clapp

(57) ABSTRACT

A system and method for analyzing geologic features including fluid estimation and lithology discrimination may include the steps of identifying areas of interest on a seismic horizon, computing statistical data ranges for the seismic amplitudes within the areas of interest, and analyzing the geologic features based on the amplitude variation with offset (AVO) or angle (AVA) curves including the statistical data ranges.

18 Claims, 12 Drawing Sheets

SYSTEM AND METHOD FOR ANALYZING GEOLOGIC FEATURES USING SEISMIC DATA

FIELD

The present disclosure relates generally to methods and systems for analyzing geologic features using seismic data and, in particular, methods and systems for analyzing geologic features based on seismic amplitude variations along offsets or angles for portions of a seismic horizon.

RELATED APPLICATIONS

The present application claims the priority benefit of U.S. Provisional Application Ser. No. 61/990,188, filed on May 8, 2014, which is incorporated herein by reference in its entirety.

BACKGROUND

In the field of exploration geophysics, seismic data is typically recorded through the use of active seismic sources, such as air guns, vibrator units, or explosives, and receivers, such as hydrophones or geophones. The sources and receivers may be arranged in many configurations. Typically, a seismic survey is designed to optimize the source and receiver configurations so that the recorded seismic data may be processed to analyze and/or locate subsurface geologic features of interest such as hydrocarbon reservoirs.

In a seismic reflection survey, seismic energy travels as an outwardly propagating wavefront through a subsurface geological structure. This energy will reflect from an interface between different rock layers before being recorded as a seismic trace by a receiver. The seismic trace is a graph of the variation of seismic amplitude versus time. The seismic amplitude depends on an angle of incidence, a density variation and a change in primary wave (e.g., P-wave, or compressional wave) and secondary wave (e.g., S-wave, or shear wave) velocity across the interface between different rock layers.

In some cases, it is desirable to analyze the recorded seismic amplitudes. This may be done in many ways. One step in conventional processing of seismic reflection data involves adding multiple seismic traces that share a common mid-point, but have different source-receiver offsets. This is commonly called "stacking". Stacking generally improves the signal to noise ratio, but can result in ambiguity surrounding the cause of the seismic amplitudes. For example, a high seismic amplitude could indicate either the presence of fluids or the presence of a particular lithology.

One conventional technique that can provide an improved method of delineating between lithology and fluids is employment of amplitude variation with offset (AVO) or angle (AVA) for a representative offset/angle gather. Those of skill in the art would be aware that amplitude variation with angle (AVA) is often used interchangeably with amplitude variation with offset (AVO).

During processing, this type of AVA data may not be stacked thereby to preserve information that can be used to distinguish indicators of fluids from indicators of lithology. For example, considering a seismic trace, in one scenario, a hydrocarbon-bearing sand may generally have an increasingly negative seismic amplitude at further source-receiver offsets compared to a water-bearing sand which may be indicated by a decrease in positive seismic amplitude at further source-receiver offsets.

The above methods may however often be biased and may not truly represent the geologic features. In addition, conventional methods may fail where seismic data quality is low, such as where random and/or coherent noise is prevalent, or where seismic gathers are not flat.

There is a need for seismic processing methods capable of producing improved AVA information that may be used for analysis of geologic features of interest.

SUMMARY

Described herein are implementations of various approaches for a computer implemented method for analyzing geologic features using seismic data.

In one embodiment, the method may include receiving the pre-stack seismic data representative of a subsurface volume of interest and one or more seismic horizons selected within the pre-stack seismic dataset, wherein the pre-stack seismic data includes an offset or angle axis; identifying one or more areas of interest on the one or more seismic horizons; computing statistical data ranges for seismic amplitudes inside each of the one or more areas of interest as a function of the offset or angle axis; generating plots of the statistical data ranges for seismic amplitudes as a function of the offset or angle axis; and determining geologic features of the subsurface of the one or more areas of interest based on the plots of the statistical data ranges for seismic amplitudes thereby to conduct fluid estimation, lithology discrimination and/or analysis, structural conformance, well-planning and/or reservoir management.

The method may further include, prior to the computing statistical data ranges, forming narrow angle or offset stacks by summing seismic data for each time or depth sample at two or more angles.

Seismic trace locations may be used in the computation of the statistical data ranges and the number of seismic trace locations used may be determined in order to provide statistically significant and reliable data. For example, the number of seismic trace locations may be selected to provide stable, distinct and/or reliable data.

The statistical data ranges may be represented by P50 probabilistic value for seismic amplitudes. Alternatively, the statistical data ranges may be represented by a P50 probabilistic value and an upper and a lower probabilistic value for seismic amplitudes, each upper and lower value similarly offset from the P50 value. For example, the upper and lower probabilistic value may respectively be a P10 and P90 probabilistic value, a P20 and P80 probabilistic value, a P30 and P70 probabilistic value, or the like. Typically, the P50 probabilistic value represents the underlying signal, while the upper and lower probabilistic values is indicative of a probabilistic range which represents the variable geology and/or noise.

In addition, or alternatively, the statistical data ranges may be presented by one or more of an average, mean, mode, or standard deviation for seismic amplitudes inside each of the one or more areas of interest. These values may also be plotted.

The method may further include, prior to determining geologic features from the plots, conducting seismic processing optimization steps on the pre-stack seismic data by repeating one or more of steps b), c) and d), and monitoring the effect of the seismic processing on the generated plots in order to assess the quality of the seismic data and/or the seismic processing optimization steps.

The seismic processing optimization steps may include varying the number of seismic traces in the seismic data.

This may include varying one or more of the shape, size, and location of the one or more areas of interest.

The seismic processing optimization steps may further include computing different statistical data ranges for the seismic amplitudes inside each of the one or more areas of interest.

Additionally, or optionally, the seismic processing optimization steps may include adjusting angle limits of any angle stacks thereby to improve signal-to-noise ratio of the seismic data.

The plots of statistical data ranges for seismic amplitudes may include one or more curves each of which is associated with a particular area of interest.

The determination of the geologic features may be based on particular characteristics of the one or more curves or a relationship between the one or more curves.

The particular features of the one or more curves may relate to zero-crossings, signal cross-over, amplitude standout, the shape of one or more of the curves and features of the respective statistical data ranges.

The method may further include using the particular features of the one or more curves to optimize angles into one or more angle bands representing one or more of short, intermediate and long source-receiver offsets.

Determining geologic features of interest may include generating optimized seismic amplitude maps based on the optimized angle bands representing one or more of the short, intermediate and long source-receiver offsets thereby to maximize seismic amplitudes.

The method may further include generating seismic forward models of geologic characteristics within the subsurface using the optimized angle bands.

Additionally, the method may include using data from the optimized angle bands to do further data modelling or to create optimized maps, graphs or the like.

The one or more areas of interest may be identified based on seismic amplitudes in the particular area of interest, which is indicative of the presence of fluids, gas, and lithology variations.

The method may further include, prior to identifying one or more areas of interest on the one of more seismic horizons, generating a graphical representation of the pre-stack seismic data as a seismic amplitude map.

Each of the one or more areas of interest may encase sufficient trace locations to ensure statistically reliable data.

In accordance with a further aspect, there is provided a computer system for processing seismic data including:
  a. a data source containing a pre-stack seismic dataset representative of the subsurface volume of interest;
  b. a computer processor configured to execute computer modules, the computer modules including:
    i. an area of interest module for identifying one or more areas of interest;
    ii. an amplitude statistics module for computing statistical data ranges for seismic amplitudes inside each of the one or more areas of interest;
    iii. a plotting module to generate plots of the statistical data ranges for seismic amplitudes as a function of the offset or angle axis; and
    iv. an analysis module for determining geologic characteristics of the subsurface of the one or more areas of interest based on the plots of the statistical data ranges for seismic amplitudes thereby to conduct fluid estimation, lithology discrimination and/or analysis, structural conformance, well-planning and/or reservoir management; and
  c. a user interface configured to present information to and receive inputs from a user.

The system may further include a stacking module to form narrow angle or offset stacks by summing seismic data for each time or depth sample at two or more angles prior to the amplitude statistics module computing statistical data ranges. The stacking module may further perform pre-processing stacking by adding multiple seismic traces that share a common reflection point (i.e. seismic trace locations) prior to the selection or identification of one or more areas of interest.

The system may further include an optimization module to conduct seismic processing optimization steps on the pre-stack seismic data by repeating one or more of steps b), c) and d), and monitoring the effect of the seismic processing on the generated plots in order to assess the quality of the seismic data and/or the seismic processing optimization steps, prior to determining geologic features from the plots.

The system may include a seismic horizon module which is configured to receive, identify and/or select one or more seismic horizons as being of interest in the seismic data identified.

The plotting module may form part of a graphics generator module. The graphics generator module may be configured to generate seismic amplitude maps.

In accordance with yet a further aspect, there is provided an article of manufacture including a non-transitory computer readable medium having computer readable code on it, the computer readable code being configured to implement a method for processing seismic data, the method may include receiving the pre-stack seismic data representative of a subsurface volume of interest and one or more seismic horizons selected within the pre-stack seismic dataset, wherein the pre-stack seismic data includes an offset or angle axis; identifying one or more areas of interest on the one or more seismic horizons; computing statistical data ranges for seismic amplitudes inside each of the one or more areas of interest as a function of the offset or angle axis; generating plots of the statistical data ranges for seismic amplitudes as a function of the offset or angle axis; and determining geologic features of the subsurface of the one or more areas of interest based on the plots of the statistical data ranges for seismic amplitudes thereby to conduct fluid estimation, lithology discrimination and/or analysis, structural conformance, well-planning and/or reservoir management.

identifying one or more areas of interest on the one or more seismic horizons;

computing statistical data ranges for seismic amplitudes inside each of the one or more areas of interest as a function of the offset or angle axis; and In yet another embodiment, an article of manufacture including a non-transitory computer readable medium having computer readable code on it, the computer readable code being configured to implement a method for analyzing geologic features using seismic data.

As used herein, except where the context requires otherwise, the term "comprise" and variations of the term, such as "comprising", "comprises" and "comprised", are not intended to exclude further additives, components, integers or steps.

The above summary section is provided to introduce a selection of concepts in a simplified form that are further described below in the detailed description section. The summary is not intended to identify key features or essential features of the claimed subject matter, nor is it intended to be used to limit the scope of the claimed subject matter.

Furthermore, the claimed subject matter is not limited to implementations that solve any or all disadvantages noted in any part of this disclosure.

Further aspects of the present invention and further embodiments of the aspects described in the preceding paragraphs will become apparent from the following description, given by way of example and with reference to the accompanying drawings.

BRIEF DESCRIPTION OF THE DRAWINGS

These and other features of the present disclosure will become better understood with regard to the following description, claims and accompanying drawings where:

DETAILED DESCRIPTION

Figure 1:
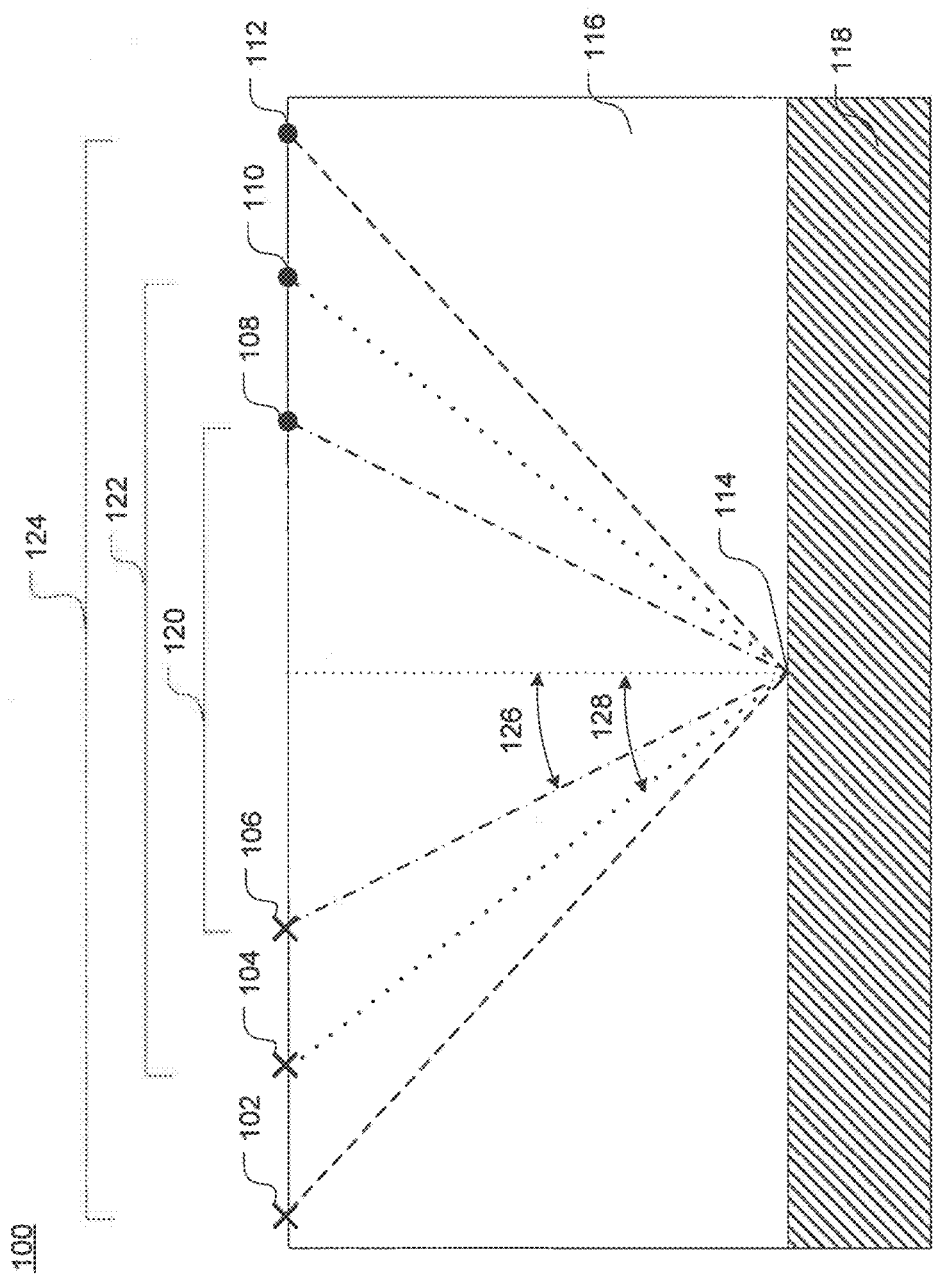
FIG. 1 shows an schematic drawing of one possible configuration of sources and receivers used in a seismic reflection survey, in accordance with prior art systems.

The present disclosure relates to a system and method for analyzing geological features using seismic data comprising a large number of seismic trace locations from an area of interest. The large number of seismic trace locations, i.e. the amount of data to be processed, necessitates the use of complex seismic processing methods, as described in detail below, to be executed by a seismic processing system including at least one computer processor. In order to analyze the geological features, the present method and system are configured to enable the determination of geological characteristics and features of the subsurface of at least one area of interest based on computed statistical data ranges for seismic amplitudes, which is presented in one example embodiment as a plot. As described in more detail below, this enables fluid estimation, lithology discrimination and/or analysis, structural conformance, well-planning and/or reservoir management.

Embodiments of the present disclosure are accordingly described and implemented in the general context of a system and computer methods to be executed by a computer. Such computer-executable instructions may include programs, routines, objects, components, data structures, and computer software technologies that can be used to perform particular tasks and process abstract data types. Software implementations of the embodiments may be coded in different languages for application in a variety of computing platforms and environments. It will however be appreciated that the scope and underlying principles of the present invention are not limited to any particular computer software technology.

Moreover, those skilled in the art will appreciate that embodiments of the present disclosure may be practiced using any one or combination of hardware and software configurations, including but not limited to a system having single and/or multiple processor computers, hand-held devices, tablet devices, programmable consumer electronics, mini-computers, mainframe computers, and the like. Embodiments of the present disclosure may also be practiced in distributed computing environments where tasks are performed by servers or other processing devices that are linked through one or more data communication networks. In a distributed computing environment, program modules may be located in both local and remote computer storage media including memory storage devices.

Also, an article of manufacture for use with a computer processor, such as a CD, pre-recorded disk or other equivalent devices, may include a tangible computer program storage medium and program means recorded thereon for directing the computer processor to facilitate the implementation and practice of embodiments of the present disclosure. Such devices and articles of manufacture also fall within the spirit and scope of embodiments of the present disclosure.

The invention can be implemented in numerous ways, including, for example, as a system including a computer processing system, a method including steps of computer implemented processing, an apparatus, a computer readable medium, a computer program product, a graphical user interface, a web portal, or a data structure tangibly fixed in a computer readable memory. Several embodiments of the present disclosure are discussed below. The appended drawings illustrate only typical embodiments or applications of the present disclosure and therefore are not to be considered limiting of its scope and breadth.

In this disclosure, geologic features include, but are not limited to, physical characteristics of the subsurface, such as the subsurface structural geometry, lithology, porosity and fluid content. The ability to identify physical characteristics of the subsurface is useful for identifying and delineating hydrocarbon reservoirs. This may have a direct impact on reserves estimation, well planning, and reservoir management, which may influence decisions involving millions of dollars.

Seismic Surveys

Seismic surveys are now described with reference to FIG. 1. As is known in the art and as already mentioned, during reflection seismic surveys a number of seismic sources, for example, seismic sources 102, 104, 106, are used to generate seismic energy. A number of receivers, for example, receivers 108, 110, 112, may be used to record the reflection of seismic energy from an interface 114 located between two geological layers, as shown by reference numerals 116 and 118 in FIG. 1. The sources and receivers are offset to one another as shown by reference numerals 120, 122, 124 and can be used to control the angle (e.g. 126 and 128) that the seismic energy impacts the interface. A person skilled in the art would appreciate that other seismic source-receiver geometries are available, for example, multi-azimuth, ocean bottom nodes, coil, 3 dimensional (3D) seismic, or the like.

The seismic energy recorded at each of the receivers 108, 110, 112, comprises a combination of signal and noise. The signal is a component of the seismic trace associated with a reflection from a geological structure, whereas noise constitutes the remaining portion of the seismic trace. Noise can be further subdivided into both coherent noise and random noise.

System

Figure 2:
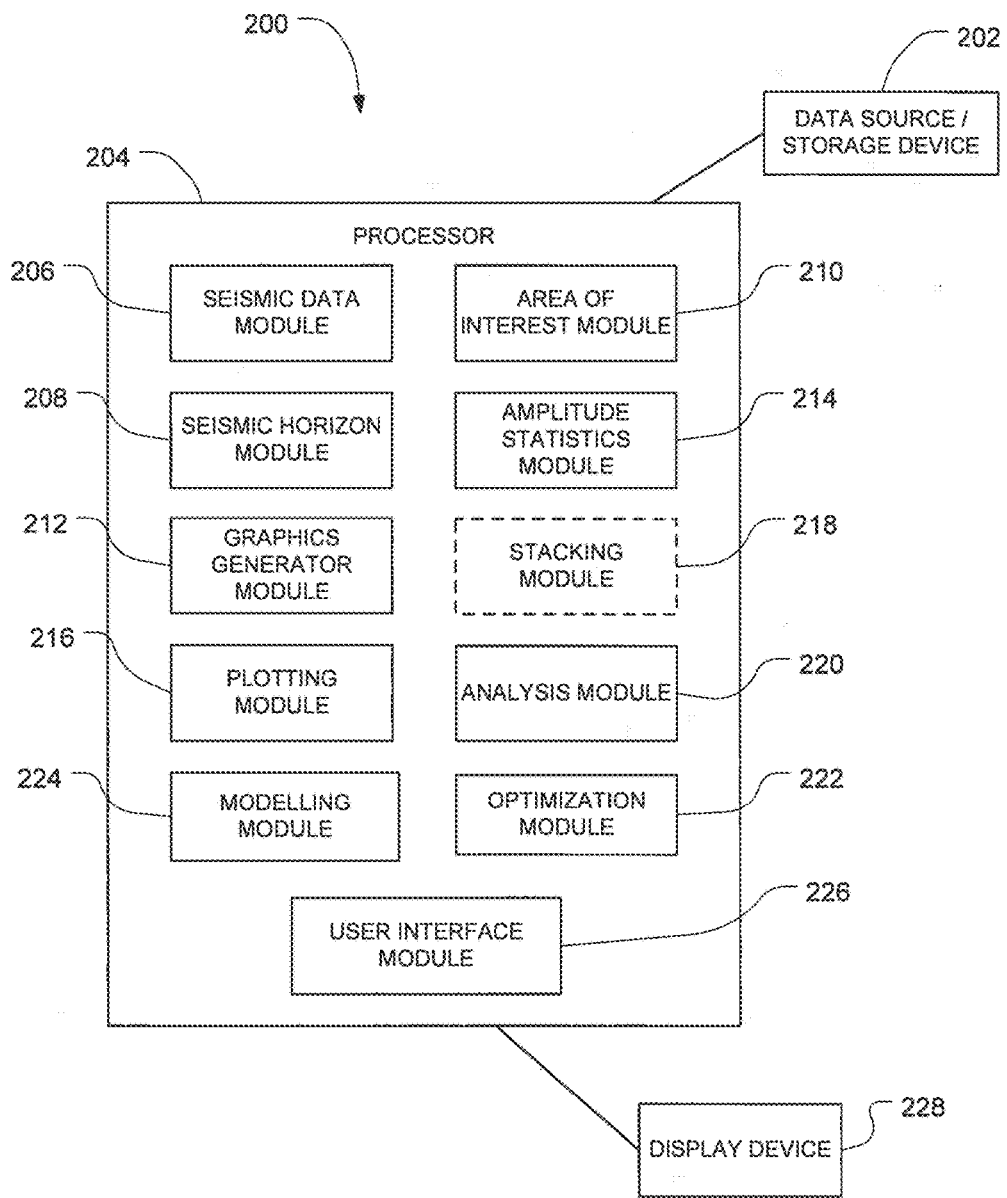
FIG. 2 schematically illustrates a system to analyze geologic features using seismic data in accordance with an example embodiment of the disclosure.

Referring now to FIG. 2, a system 200 for analyzing geologic features of interest using seismic data is shown. The system 200 includes a data source/storage device 202 which may include, among others, a data storage device or computer memory. The data source/storage device 202 may contain recorded seismic data from a seismic reflection survey described with reference to FIG. 1, and/or synthetic seismic data.

The data from data source/storage device 202 is made available to a processor 204, such as a programmable general purpose computer, for further processing, analysis, modelling and/or presentation of the subsurface geological features. The processor 204 is configured to execute computer modules that implement the processing, analysis, modelling and presentation of these geologic features of interest.

A "module" in the context of the specification will be understood to include an identifiable portion of code, computational or executable instructions, data, or computational object to achieve a particular function, operation, processing, or procedure. It follows that a module need not be implemented in software; a module may be implemented in software, hardware, or a combination of software and hardware. Further, the modules need not necessarily be consolidated into one device.

A high level description of the computer modules forming part of the system 200 is now provided. Detailed functionality of the computer modules may become more apparent from the description of the methods of analyzing geologic features of interest of the present disclosure, as set out further below.

The system's computer modules may include a seismic data module 206 configured to obtain seismic data from the data source/storage device 202. A seismic horizon module 208 is configured to receive, identify and/or select one or more seismic horizons, i.e. seismic events (e.g., a reflection) in the seismic data identified as being of interest.

An area of interest module 210, also executed by the processor 204, is to obtain, identify and/or select one or more local areas of interest on each seismic horizon. In one example embodiment, the area of interest module 210 may receive an instruction from a user identifying and selecting the one or more local areas of interest on the seismic horizon, with such instruction based on a visual presentation in the form of one or more seismic horizon maps presented to the user. The visual presentation may be presented to the user by a graphics generator module 212 on a display device 228. As will be described in more detail below, the areas of interest may also be identified or defined based on planned analysis of the geological features, for example updip, downdip and shale polygons described in more detail below.

In one example embodiment, the area of interest module 210 may be configured to perform this step of selecting the one or more local areas of interest automatically, e.g., with limited or no user input, based on preprogrammed rules to be applied to the data relating to the seismic horizon.

Additional computer modules executed by the processor 204 include an amplitude statistics module 214 configured to compute statistical data ranges (e.g., P20, P50, P80, or also an average, mean, mode, or standard deviation) on the seismic traces within the one or more areas of interest thereby to enable statistical analysis of the seismic traces. A plotting module 216, that may, but need not form part of the graphics generator module 212, is configured to present graphically the statistical data by plotting (in one example embodiment) the statistical data ranges as AVA curves on a graph.

The processor 204 may further execute a stacking module 218 which is configured to perform a variety of stacking functionalities, in that it may add multiple seismic traces that share a common reflection point prior to the generation of the mapped seismic horizons by the graphics generator module 212. It may also prepare narrow angle stacking, which is the summation of seismic traces for a time or depth sample at two or more angles, e.g., adjacent angles, before the plotting module 216 plots statistical data ranges as AVA curves.

An analysis module 220 is provided and configured to assist in the analysis of various geologic features in the areas of interest, using, in one example embodiment, the AVA curves plotted by the plotting module 216. The operation of the analysis module 220 is described in more detail further below.

Depending on the analysis and quality of the results obtained and/or generated by the analysis module 220, e.g., the impact of noise, areas of interest chosen, number of seismic trace locations, or the like, an optimization module 222, also executed by the processor 204, may control the repetition of functionalities of various modules, e.g., the selection of areas of interest, encasing a number of seismic trace locations used in the processing of data associated with an area of interest, etc. This is to monitor and improve the analysis and identification of geological features in the downstream data processing steps. The optimization module 222 may, in one example embodiment, obtain instructions from the user to repeat some of the processing steps.

One of the outcomes of the processing by the analysis module 220 and the optimization module 222 above, which is in one example embodiment based on the characteristics of the plotted AVA curves, is the creation and/or selection of optimized angle ranges that may be used to generate optimized seismic amplitude maps or that may be used in further modelling by a modelling module 224.

The system 200 also includes a user interface module 226 which is configured to present a graphical user interface with which a user is to interact. For example, the graphical user interface may display information and obtain inputs from a user during operation of the system 200. Various input devices, such as a computer keyboard, mouse, touch screen or the like may be employed in receiving inputs from the user. One or more display devices 228, e.g., LCD displays, LED displays or touch screens, forming part of the system 200, may display the graphical user interface. In other words, the user interface module 226 may be used both in the display of data and processed data products and to allow the user to select among options for implementing aspects of the method. By way of example and not limitation, the input seismic data and/or the AVA curves computed on the processor 204 may be displayed by the user interface module 226, stored on the data storage device or memory 202, or both displayed and stored.

Method

Figure 3:
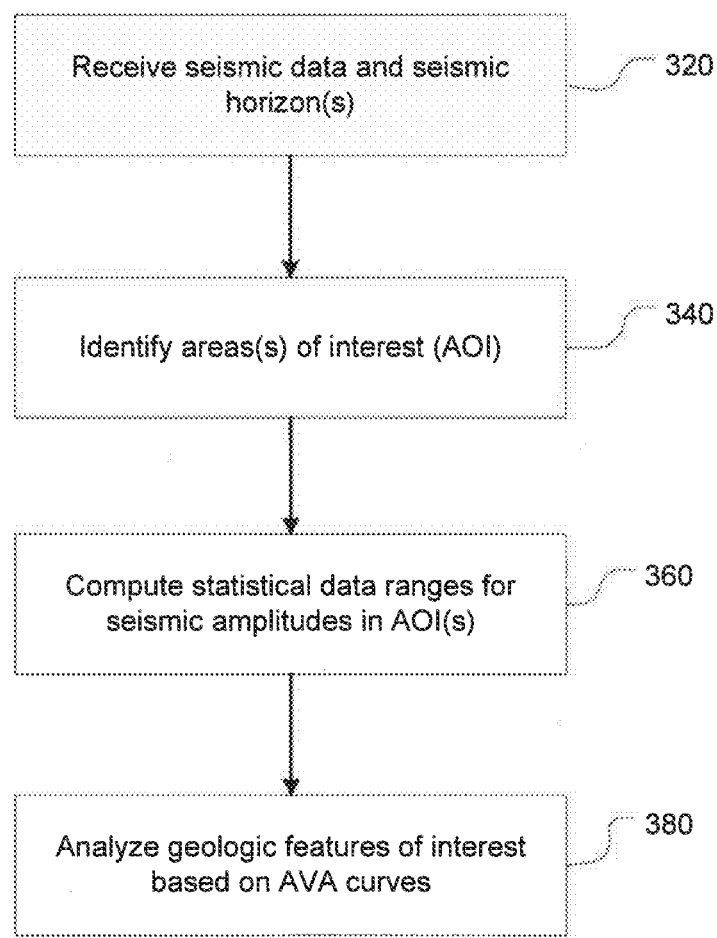
FIG. 3 shows a flowchart illustrating a method for analyzing geologic features using seismic data in accordance with an example embodiment, which may be implemented in one embodiment by the system of FIG. 2.

As shown in FIG. 3, one embodiment of a method for analyzing geologic features of interest using seismic data, such as pre-stack seismic data, is indicated by reference numeral 300. This method may, but need not, be implemented by the system 200 of FIG. 2. However, by way of example, in the paragraphs below the method is described as being implemented by the system of FIG. 2.

The method is performed on seismic data which may, for example, be obtained from a data source/storage device 202 which holds data recorded from a reflection seismic survey or synthetic seismic data, as already described above.

At operation 320 of the method 300, pre-stack seismic data is obtained by the seismic data module 206 as a pre-stack seismic dataset from the data source or storage device 202. In one example embodiment, the pre-stack seismic dataset may include an axis (or dimension) representative of the offset between the seismic sources and seismic receivers and/or an axis representative of the reflection or opening angle at a subsurface point. In one embodiment where vast amounts of seismic data is obtained from a large number of seismic trace locations, the seismic data may be indexed by the seismic data module 206 in order to reduce the time taken to perform further analysis and calculations.

Further at operation 320, information on seismic horizons is received, identified and/or selected by the seismic horizon module 208. As mentioned, seismic horizons represent seismic events identified or selected, in one embodiment, by a user as being of interest. These seismic horizons may represent a single thin lithology, such as a sand layer or a shale layer, or an interface within one or between two or more lithologies.

The seismic horizons chosen by a user or identified by the seismic horizon module 208 may be represented in time or depth by the graphics generator module 212 with the seismic data obtained at operation 320 being optionally flattened, by e.g., the seismic horizon module 208, on one or more of the horizons. As is known, flattening of seismic data is used to remove the influence of geological processes such as folding and faulting in one or more the lithological interfaces from the data, enabling images produced from the seismic data to be processed into horizontal layers, e.g., for easier interpretation. The flattening of seismic data is an optional step.

The seismic data and seismic horizons received in operation 320 may be two-dimensional (2-D) (e.g., a horizontal dimension "x" and a time or depth dimension "z") or three-dimensional (3-D) data sets (e.g., two perpendicular horizontal dimensions "x" and "y" and a time or depth dimension "z").

At operation 340, one or more areas of interest are identified on the seismic horizons. In an embodiment using 3-D data, the areas of interest may be identified on a map view of the one or more seismic horizons, e.g., as polygons, wherein the map view may be coloured (or shaded or contoured) to indicate the seismic amplitudes along the particular horizon.

Map View of Seismic Horizon

Figure 4:
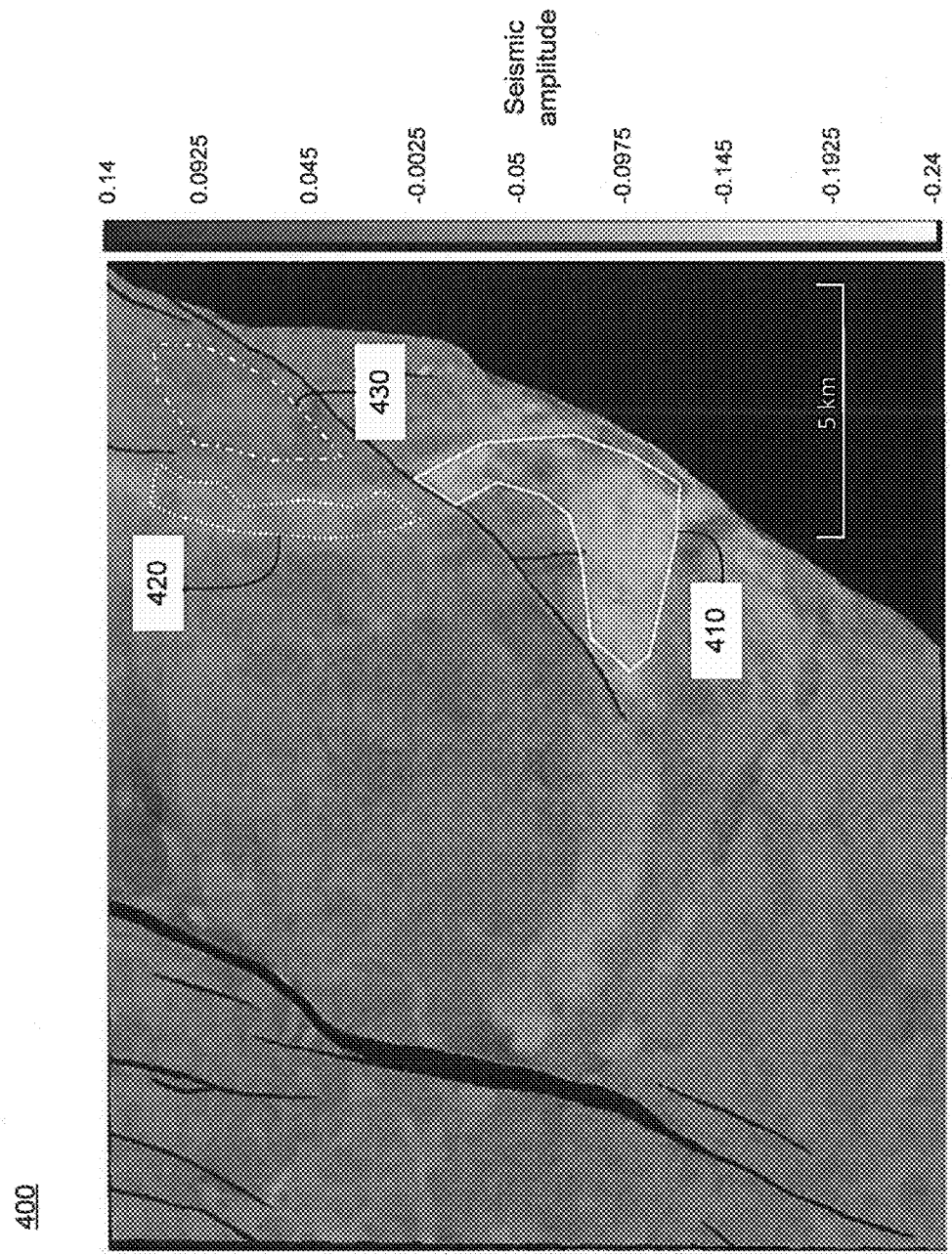
FIG. 4 shows a seismic amplitude map obtained from stacking a near full range of angles between 4° to 60° on which various selected areas of interest are indicated, in accordance with the method of FIG. 3.

One example of a map view of a seismic horizon, including a seismic amplitude legend to the side thereof, is shown in FIG. 4. In order to create this map view 400, a full range of seismic amplitude data has been stacked, which in this example embodiment is seismic amplitude data between angles 4° and 60°, as part of a data preprocessing step. This type of stacking may be done by the stacking module 218. The map indicates different regions of varying seismic amplitudes (indicated in differing shades) mostly correlating with the distribution of lithology, as well as liquids and gas, e.g., hydrocarbons. These differences in seismic amplitude across the chosen angle range are used to delineate the specific areas of interest. The area of interest module 210 may be used to either select the areas of interest through analysis of the data or may be configured to receive inputs from the user, e.g., through the user interface module 226.

In this example of FIG. 4, an updip polygon is chosen in an area of general negative seismic amplitude, see reference numeral 410, and may, e.g., represent the crest of an upwardly slanting layer of rock, i.e., the pinnacle of an anticline (or updip). This indicates, in this particular example, a location where gas or oil are most likely to be found.

Usually and if present, oil or water would occur in a downdip downslope from the updip polygon 410. In the particular example of FIG. 4, a downdip polygon 420 is therefore chosen in an area with a seismic amplitude generally higher (i.e. less negative) than that of the updip area 410.

As is evident from FIG. 4, a shale polygon 430 is also chosen in an area with a seismic amplitude generally higher than both the updip and downdip polygons 410, 420. It may be necessary to take additional information relating to a trend of the dip into account when choosing a particular polygon, e.g., the shale polygon 430 may be chosen furthest away from the updip polygon 410.

It would be appreciated by a person skilled in the art that this example is not meant to be limiting and that other seismic amplitude variations may correspond to different structural configurations and locations of gas, oil or water. For example, in other embodiments, the updip polygon representing a location where gas or oil are located may be chosen in an area of positive (and high) seismic amplitude, while the downdip polygon representing locations of oil or water may be chosen in an area of negative (and low) seismic amplitude.

In some embodiments, each area of interest may encase a large number of seismic trace locations. In terms of the present disclosure, it is important to include a sufficient number of seismic trace locations (resulting in a sufficient number of seismic traces or data sets to be processed) thereby to ensure statistical stability of the resulting AVA curves.

The statistical data ranges are influenced and determined by a range of geology enclosed in the selected area of interest (i.e. polygon) and noise. The range of geology may include, for example, changes in thickness, porosity, grain size, cementation or the like. Statistical stability of the data is ensured by making the area of interest (polygon) sufficiently large to ensure that the noise is averaged out, as well as large enough to contain a representative sampling of the geology.

Referring again to FIG. 3, in operation 360 statistical data ranges are computed for the seismic amplitudes in each of the areas of interest, shown in the example of FIG. 4 as updip, downdip and shale polygon 410, 420 and 430. These computations and calculations may be performed by the amplitude statistics module 214 in that it reads seismic angle gathers, i.e. all of the seismic traces at a particular angle for an area of interest, identifying a time gate centered on the seismic horizon, and computing the aggregated amplitudes at each angle. The time gate has the effect of isolating a portion of each selected trace around a feature of interest in time. This process of computing the statistical data ranges for the seismic amplitudes in each of the areas of interest is computationally expensive.

A person skilled in the art would appreciate that the computation and calculations of statistical data ranges can be performed using pre-stack seismic data in depth coordinates, rather than time coordinates, and identifying a depth gate centered on the seismic horizon.

In terms of the present disclosure it is advantageous to calculate the probability of various seismic amplitudes within the area of interest, thereby allowing the statistical data ranges of seismic amplitudes to be determined. In some embodiments, the statistical data ranges may be represented by P50 and an upper and a lower probabilistic value for seismic amplitudes, each of the upper and lower values being similarly offset from the P50 value. For example, the upper and lower probabilistic values may respectively be selected as a P10 and a P90 probabilistic value, a P20 and a P80 probabilistic value, a P30 and a P70 probabilistic value, or the like. These values are provided by way of example only and are not meant to be limiting.

Typically, the P50 probabilistic value represents the underlying signal, while the upper and lower probabilistic values are indicative of a probabilistic range which represents the variable geology and/or noise. A variety of statistics may be computed from the aggregated seismic amplitudes, i.e. in addition, or alternatively, to the probabilistic values mentioned above. For example, the statistical data ranges may include one or more of an average or mean (such as an average absolute amplitude), a mode, or a standard deviation such as RMS amplitude. It will be appreciated that other statistical measures may also be used. The use of many seismic trace locations from the areas of interest may assist in obtaining statistically significant data, in that the data may be more stable and distinct.

In addition, in another embodiment, narrow angle stacks may be created by the stacking module 218 which computes these narrow angle stacks. This may, e.g., occur prior to the operation 360, i.e. prior to the amplitude statistics module 214 computing statistical data ranges. As mentioned above, it will be understood that narrow angle stacking refers to the process of summing the seismic traces for each time or depth sample at two or more angles, e.g., adjacent angles (such as 1-2°, 2-3°, 3-4°, etc). A normalization based on the number of traces summed may be used in order to obtain an optimum presentation of the results. In other words, these narrow angle stacks may in some instances stabilize the trend of the AVA curves produced. It will however be appreciated that in many cases there may be no need for this type of stacking.

Once the statistical data ranges have been computed by the amplitude statistics module 214, geologic features of interest are analyzed at operation 360 of method 300, e.g., by the analysis module 220. In an embodiment, the analysis may be done after the plotting module 216 has plotted P50 AVA curves (also called plots) for each of the areas of interest. In another embodiment, the data ranges, e.g., the range between a P20 and a P80 value, for each angle, angle stack, offset or offset stack within an area of interest, may also be plotted thereby to indicate the various data ranges. The geologic features analyzed using AVA curves may include, by way of example and not limitation, fluid estimation and discrimination, lithology discrimination and analysis, and structural conformance.

As will become apparent from the description below, the AVA curves produced allow for enhanced analysis of geologic features. The information obtained from analysis of the AVA curves may, for example be used to generate seismic forward models of geological characteristics within the subsurface using optimized angle bands (also called optimized angle stacks below). In addition, or alternatively, the data obtained from such analysis and optimized angle bands may further be used to perform further data modelling or to create optimized maps, graphs or the like.

The AVA curves generated in various embodiments of the present disclosure may include the data ranges calculated during the statistical computations. As mentioned, the AVA curves themselves may be representations of the P50 (e.g., most likely) amplitudes for the local seismic horizon. Since the P50 amplitudes are aggregated from a number of seismic traces in the local area, e.g., a large number of seismic traces, they represent seismic amplitudes that have a superior signal-to-noise ratio and are likely more stable and robust than conventional AVA methods. For example, it may provide a large reduction of random noise and coherent noise.

These robust P50 curves are typically therefore useful for analysis of geologic features that conventional methods cannot handle, such as, by way of example and not limitation, the ability to detect small signals indicative of deep exploration or identification of fizz gas (i.e. a low saturation gas mixed with brine or water, which usually poses problems for conventional methods of discriminating between economic gas reserves and uneconomic water or brine). In addition, the data ranges themselves, which in some embodiments may be indicated as the P20-P80 ranges, may contain key information about the seismic data quality such as noise and the signal-to-noise ratio, as well as information about optimal stacking ranges along the angles or offsets.

Interpretation and Analysis of AVA Plots

Figure 5:
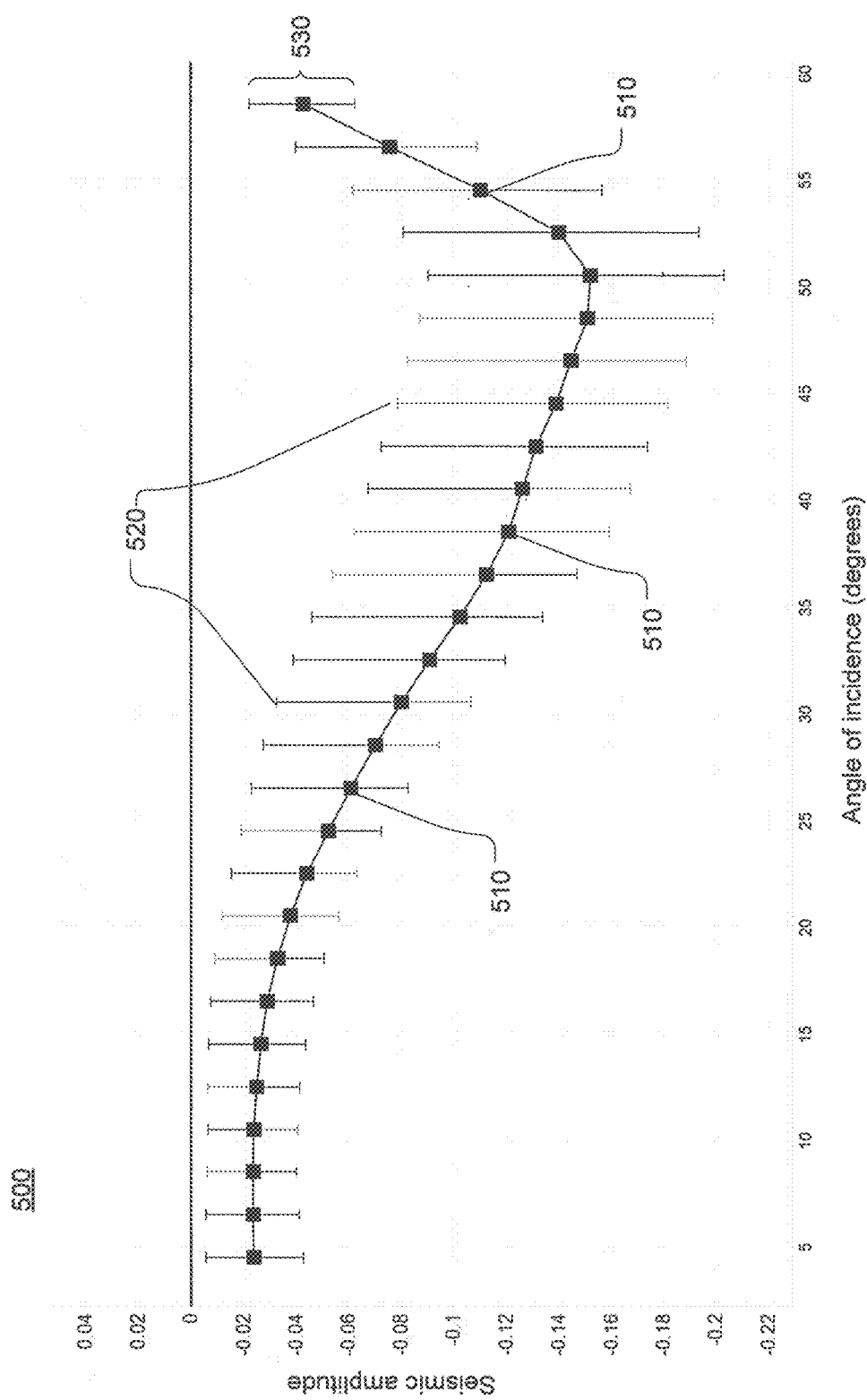
FIG. 5 shows an example AVA curve produced from seismic data within a particular area of interest shown in FIG. 4, in accordance with the method of FIG. 3.
Figure 6:
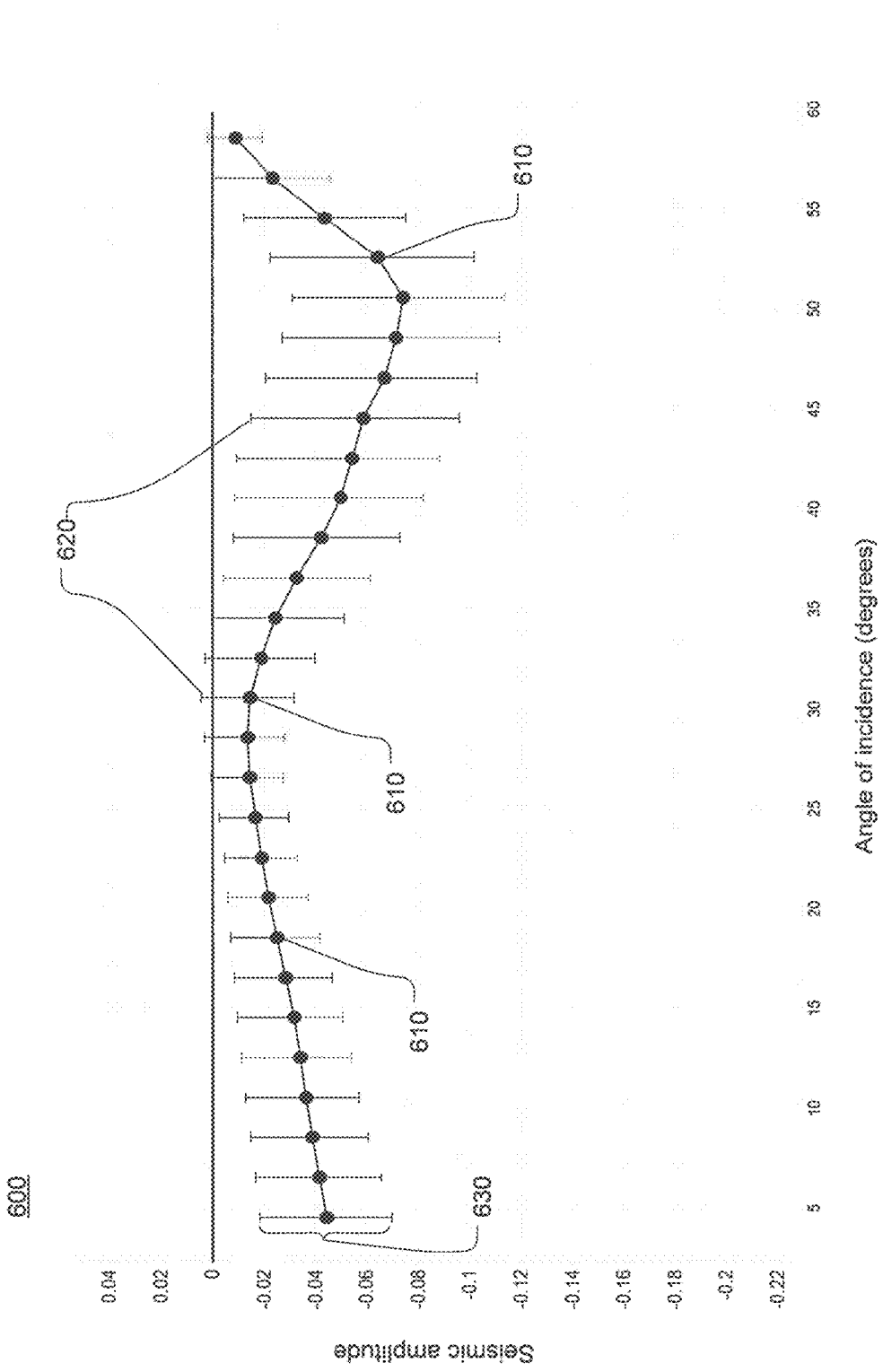
FIG. 6 shows an example AVA curve produced from seismic data within another area of interest as shown in FIG. 4, in accordance with the method of FIG. 3.
Figure 7:
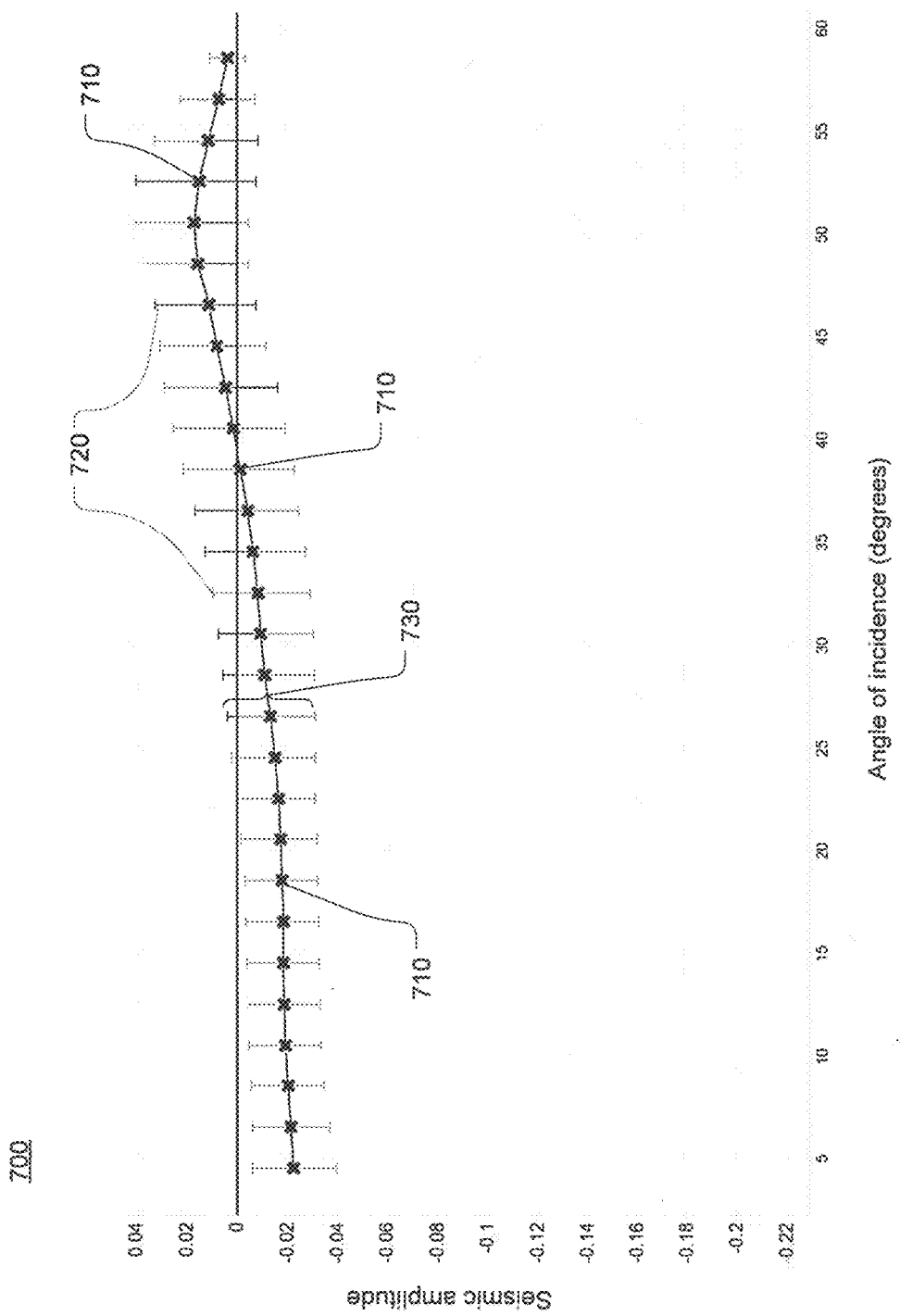
FIG. 7 shows an example AVA curve produced from seismic data within yet another area of interest as shown in FIG. 4, in accordance with the method of FIG. 3.

The objective of the AVA curves produced by the method 300 is to be superior to those produced by conventional methods in several ways. These AVA curves are aimed to have characteristics that can be exploited, analyzed and further modelled. Examples of AVA curves 500, 600 and 700, produced as part of the present disclosure, are shown in FIGS. 5, 6 and 7 and will be described further below.

In identifying localized areas of interest on the seismic horizons, the production of AVA curves that define the AVA character within the localized region of interest in detail, rather than that of the entire region, is enabled. The local AVA character accordingly allows these curves to be used for geological interpretation of the chosen areas of interest. For example, an AVA curve representing a wet sand horizon should typically be parallel or sub-parallel to one representing a gas sand or oil sand, i.e. the parallel nature of the curves is indicative of a fluid. In another example, AVA curves representing a top sand and a bottom sand should be mirror inverses of each other (i.e. lithology variations), if the top shale and base shale have the same rock properties.

As described by way of example below, AVA plots generated in various embodiments of the present disclosure may also be used to fully characterize an area of interest (i.e. prospect) or analog. The nature of the AVA curves may further be used to identify any amplitude variation, such as amplitude standout, indicate the presence of associated fluid (gas, oil, brine), and indicate any variation in porosity, thickness, and lithology (e.g., sand, shale, coal).

In addition to these uses, and as mentioned above, the optimized AVA curves generated in some embodiments can provide information on seismic data quality, the validity/quality of the seismic horizons, and differences in the shale above and below a potential hydrocarbon sand. This information may be valuable in terms of the operation of the optimization module 222, in that it may be taken into account further to optimize results. Yet another potential use is that these AVA curves may enable determining the spatial stability of the underlying amplitudes.

The large number of seismic trace locations (e.g., in one particular example embodiment, more than 10,000 trace locations within an area of interest) used by this method may result in improved statistical reliability, consistency in data and stable AVA curves. In the event that the results indicate statistical unreliability, inconsistency and unstable curves, the optimization module 222 may be employed to adjust certain processes. E.g., polygons defining the areas of interest may be adjusted (e.g. their shape, size or location) or the number of seismic trace locations used from these areas of interest may be changed.

The AVA plots generated by the plotting module 216 may be representations of the P50 (e.g., most likely) amplitudes for the local seismic horizon. Since the P50 amplitudes are aggregated from a number of seismic traces in the local area, e.g., a large number of seismic traces, they represent seismic amplitudes that have a superior signal-to-noise ratio and are likely more stable and robust than conventional AVA methods. For example, the P50 amplitudes may provide a large reduction of random noise and coherent noise, similar to, but potentially superior to, the result of stacking.

Example AVA Curves

Turning to the three example AVA curves 500, 600 and 700 of FIGS. 5, 6 and 7, each AVA curve is a representation of the P50 (i.e. most likely) amplitudes for the local horizon plotted from the seismic traces in FIG. 4. In particular, the AVA curve 500 of FIG. 5 is a representation of the updip polygon 410 of FIG. 4, the AVA curve 600 of FIG. 6 is a representation of the downdip polygon 420 of FIG. 4, and the AVA curve 700 of FIG. 7 is a representation of the shale polygon 430 in FIG. 4. Some of the P50 values forming the respective AVA curves are indicated by reference numerals 510, 610 and 710 respectively in FIGS. 5 to 7.

In these examples, narrow angle stacking has been used by summing seismic traces at adjacent angles thereby providing about 28-30 summed seismic traces (some of which are indicated by reference numerals 520, 620 and 720 in FIGS. 5 to 7) as narrow angle stacks. The probability of seismic amplitudes within each polygon 410, 420 and 430 has been calculated, which gives rise to a respective data range 530, 630, 730 of seismic amplitudes for each narrow angle stack. In the examples of FIGS. 5 to 7, each data range 530, 630 and 730 for a narrow angle stack is shown as a P20 and P80 range bar which vary depending on the angle between the source and receiver, as well as the quality of the data at the particular narrow angle stack. Where the data is noisy, the quality of the seismic signal is reduced, resulting in a greater data range (see e.g., angles 25-57° in FIG. 5). For this reason, data may sometimes be excluded from the AVA curve at particular angle ranges, typically higher or lower angles, but also intermediate angles, should the data associated with these angles become too unreliable.

A person skilled in the art would appreciate that the number of narrow angle stacks used to compute the statistical data ranges would vary depending on the seismic data obtained from the survey location/s, and as already mentioned, the step of stacking may be left out altogether. The number of angles to be stacked may also be adjusted during optimization of the results. Furthermore, and as previously mentioned, it would be appreciated that seismic amplitude may also be plotted with respect to offset.

Optimization of Angle Stacks/Bands

Figure 8:
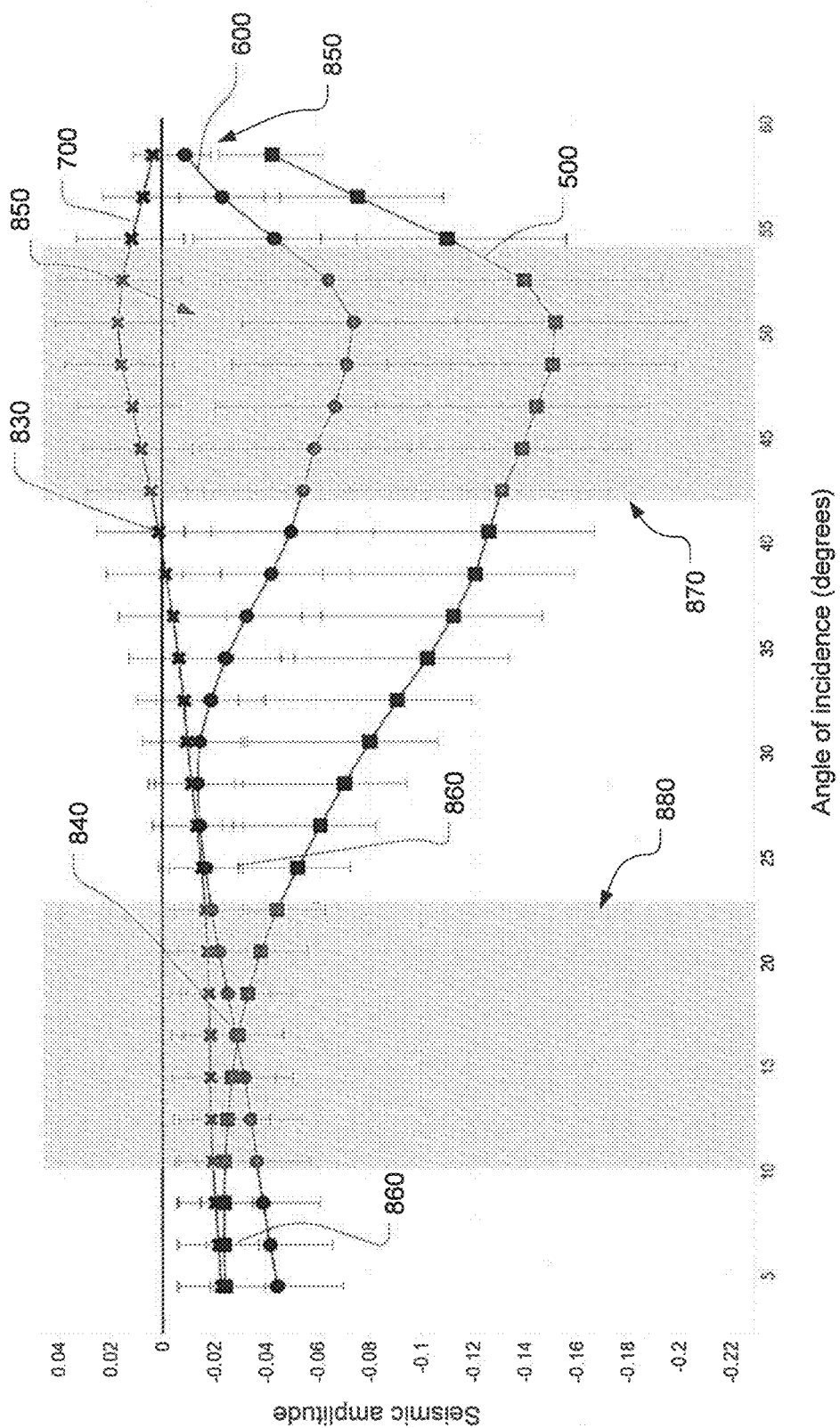
FIG. 8 shows the example AVA curves of FIGS. 5 to 7 plotted on the same graph, in accordance with the method of FIG. 3.

One or more of the AVA curves may be plotted together thereby to assist in the interpretation and analysis of geologic features. For example, and as shown in FIG. 8, the respective AVA curves 500, 600 and 700 of the updip polygon 410, the downdip polygon 420 and the shale polygon 430 from FIGS. 5 to 7 can be combined for further interpretation. As is apparent from FIG. 8, the AVA curve 500 from the updip polygon 410 has a sub-parallel nature to the AVA curve 600 from the downdip polygon 420, which is suggestive of gas or fluid or both being present. In comparison, the approximately inverse nature of the AVA curve 700 of the shale polygon 430 to the AVA curves 500 and 600 of the updip 410 and downdip 420 polygons is indicative of a difference in lithology.

In some embodiments AVA curves generated by the present method and system may be compared against one or more reference AVA curves, for example modeled AVA curves, with information contained in the differences then being interpreted.

In addition to the interpretive uses and potential advantages of the AVA curves themselves, the method and system described may assist in optimization of the angle bands, as briefly mentioned above. The specific angle bands for each profile within an area of interest may be tailored to provide a variety of uses such as maximizing fluid discrimination and maximizing lithology discrimination by avoiding or exploiting an amplitude polarity change with angle (sometimes known as a zero cross-over), avoiding or exploiting a signature cross-over, maximizing signal and/or minimizing noise. An example of a zero cross over is indicated by reference numeral 830 in FIG. 8 while a signature cross-over is indicated by reference numeral 840.

Once one or more AVA curves have been produced and plotted for a particular area of interest, information may be inferred from characteristics of these AVA curves, alone or in combination, to assist with the optimization of the narrow angle bands or stacks thereby to improve the analysis of geologic features. The analysis module 220 is configured to manage this step. The determination and use of these optimized angle bands are to be contrasted to the use of standard predefined angle bands, i.e. 5-20° for "nears", 18-33° for "mids" and 31 to 46° for "fars", as is known in the art.

For example, in some embodiments, in order to optimize angle bands by reducing noise, a higher angle (e.g., 7°) may be chosen as the lower limit of optimized "nears", while a lower angle (e.g., 42°) may be chosen as the upper limit of optimized "fars". This decision is typically informed by the particular P20-P80 data ranges (which indicate noise) of the lower angles conventionally used for the "nears" and higher angles conventionally used for the "fars".

One or more optimized angle bands may also be chosen not to include zero-crossings of any of the AVA curves thereby to avoid unreliable signals associated with zero-crossings. Alternatively, the upper and lower limits of an optimized angle band may be chosen to have an equal angle range on each side of a zero-crossing associated with a particular AVA curve. This results in the reduction of the particular AVA curve's amplitudes, which leaves only the impact of other AVA curves. For example, in the event that only the updip and downdip AVA curves are plotted, if the upper and lower limits of an optimized "mids" angle band is chosen to have an equal angle range on each side of the zero-crossing of the downdip AVA curve, the result would be the reduction of the downdip AVA curve's amplitudes, leaving only the impact of the positive amplitudes of the updip AVA curve. This should be indicative of the presence of gas or fluid.

The upper and lower angle limits of an optimized angle band (sometimes also called optimized angle stack) may also be chosen around a symmetric midpoint in two curve shapes thereby to provide more reliable data. Also, if two curves have a variation in their general curve trend at a similar angle range, this may indicate variations in the fluid, lithology, porosity, or thickness.

Returning to the specific example of FIG. 8, if at least two AVA curves are plotted on the same graph (as shown in the example of FIG. 8), areas where the P20-P80 data range bars do not overlap, e.g., as indicated by reference numeral 850, may indicate statistically distinct data compared to angles where the data range bars overlap, e.g., as indicated by reference numeral 860. The statistically distinct angle range would therefore potentially be a good angle range.

In the example embodiment of FIG. 8, in contrast to using standard predefined angle bands of 5°-20° for "nears", 18°-33° for "mids" and 31° to 46° for "fars", a non-standard optimized angle band of 42°-54° for "fars" is selected using the steps above. This optimized angle band is indicated by reference numeral 870 in FIG. 8. This range is chosen due to the determination of these angles representing statistically significant and reliable data, e.g., distinct, consistent and stable, and including an amplitude standout, in that the biggest deviation from zero occurs in the range. As will be apparent from the discussion of FIGS. 10 and 11 below, the selected optimized, non-standard angle band assists in fluid estimation and provide maximized signals while minimizing noise. In using this angle band optimized AVA maps may be generated thereby to more fully characterize a prospect or analog and the nature of the AVA curves define amplitude standout in terms of both fluid (e.g. gas vs. wet) and lithology (e.g. sand vs. shale) which is visible in FIGS. 10 and 11. This may have the result of improving the strength of signal thereby allowing for the improved delineation of fluids and lithology variations in the chosen areas of interest.

By way of example only, a non-standard angle band of 10°-23° for "nears", with this angle band is chosen to surround the signature cross-over point and in a range where the data is not unique (the statistical data ranges overlap), no amplitude standout occurs and the P50 values are all nominally the same. This particular angle band of 10°-23°, indicated by reference numeral 880 in FIG. 8, will be shown as poor with reference to FIGS. 14 and 15 in further paragraphs.

Yet another embodiment may involve measuring AVA vertical trends (AVA curves calculated at different time or depth horizons) to diagnose vertical trends in the rock properties and/or comparing them with AVA vertical trends calculated at a different lateral location (e.g., at two adjacent structural highs) to diagnose lateral changes in the rock properties.

Examples of Seismic Amplitude Maps with Different Angle Ranges

In optimizing the selection of angle band thereby to maximize the signals as described above, improved seismic amplitude maps may be generated. An example of a seismic amplitude map for the optimized angle range of 42°-54° is shown in FIG. 9, which allows for the improved delineation of fluid and lithology variations within an area of interest.

Figure 10:
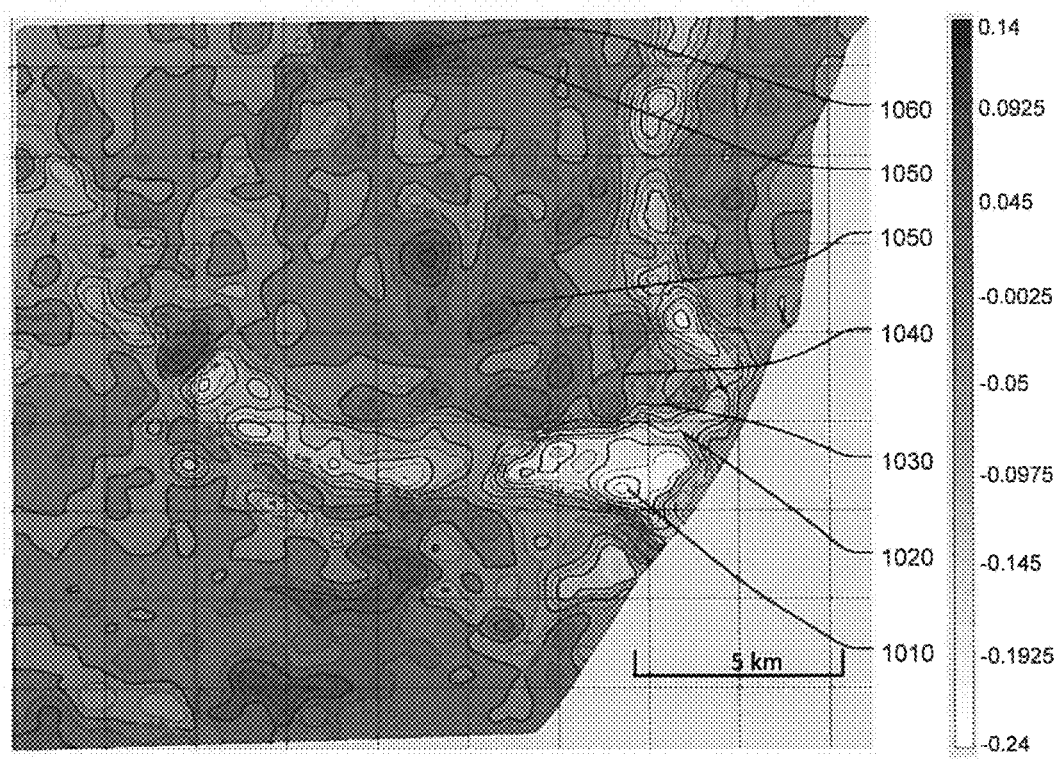
FIG. 10 shows contours superimposed on the optimized seismic amplitude map of FIG. 9.

For the sake of clarity, this map is also shown in FIG. 10, this time with contours, where the contour interval is equal to 0.02. Increasing seismic amplitudes are indicated by an increase in the reference numerals 1010 to 1060. For example, reference numeral 1010 indicates −0.24 seismic amplitude, reference numeral 1020 indicates −0.12 seismic amplitude. Similarly reference numeral 1040 indicates 0.00 seismic amplitude while reference numeral 1050 indicates 0.04 seismic amplitude.

From this drawing, the lighter areas, i.e. with a seismic amplitude level between −0.24 and −0.12 indicate the presence of fluids and lithology variations in particular areas. If these areas are compared with the full stack shown in FIGS. 11 and 12 it is apparent that the areas are better defined and delineated in the map of FIGS. 9 and 10. If this particular angle band is then used in further processing etc, it may result in enhanced fluid estimation, lithology discrimination, well-planning and/or reservoir management.

Figure 9:
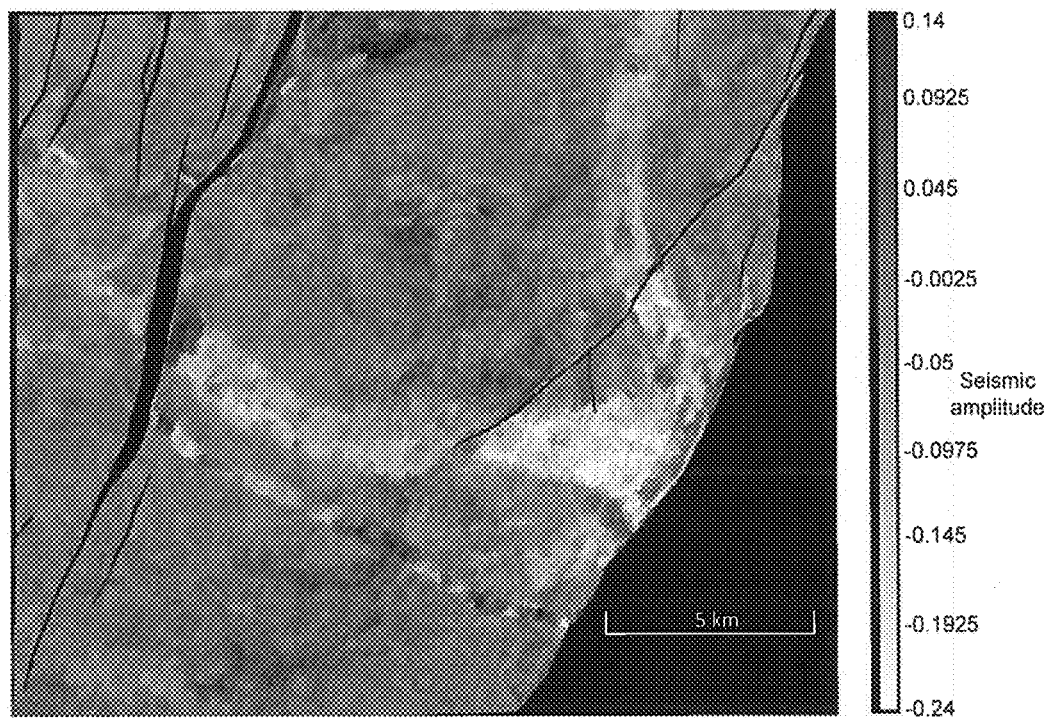
FIG. 9 shows an optimized seismic amplitude map for a (far) source-receiver offsets at an angle range of 42° to 54° based on the example AVA curves of FIG. 8, generated in accordance with the method of FIG. 3.
Figure 11:
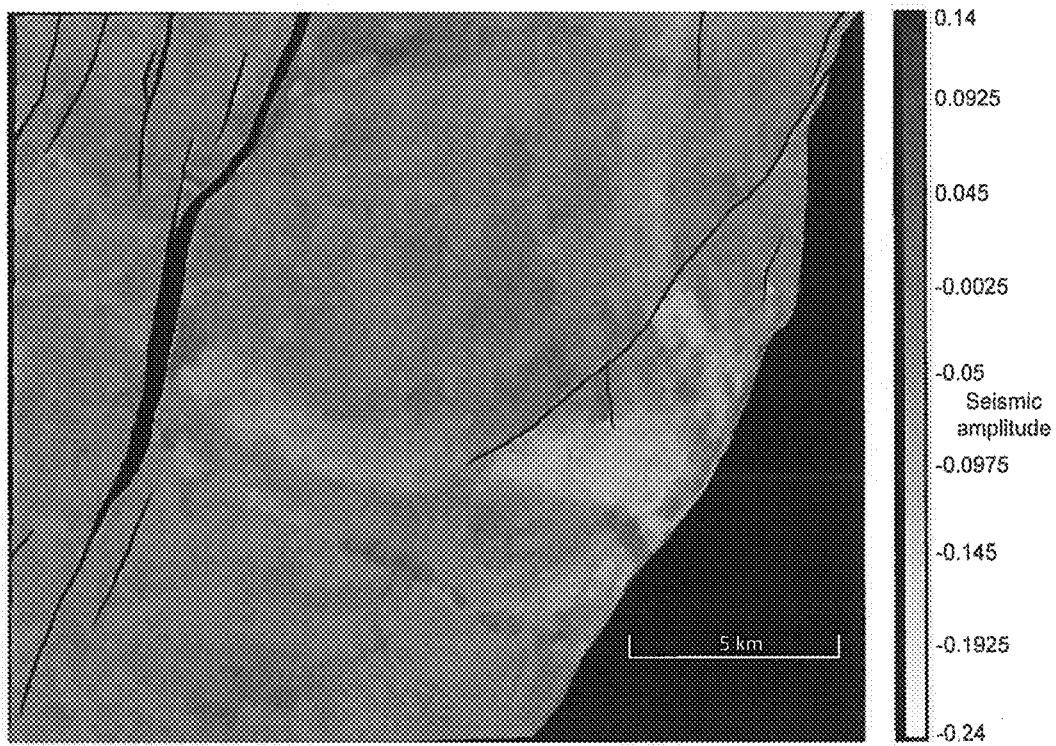
FIG. 11 shows an un-optimized seismic amplitude map for an angle range of 4° to 60.
Figure 12:
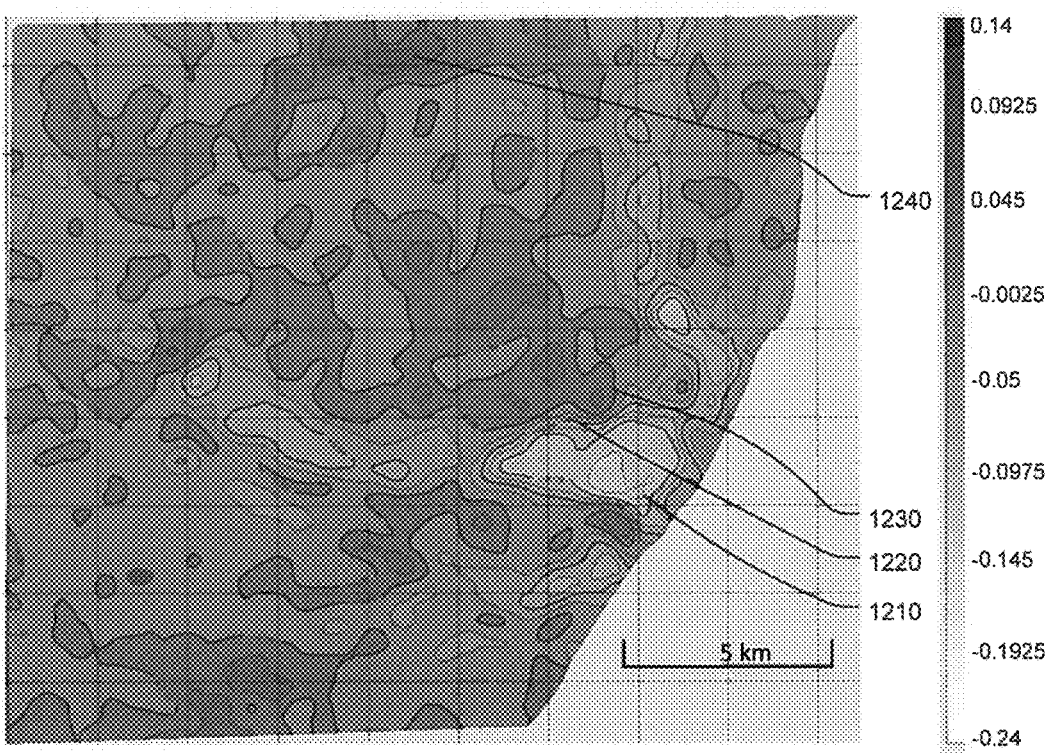
FIG. 12 shows contours superimposed on the un-optimized seismic amplitude map of FIG. 11.

The seismic amplitude map of FIGS. 9 and 10 is to be contrasted to the seismic amplitude map of turning to FIGS. 11 and 12, which was generated based on un-optimized, angle stacks 4°-60°. Thus, the map of FIGS. 11 and 12 correspond with the map of FIG. 4, used for the selection of the areas of interest. The un-optimized, angle stacks 4°-60° reduce the quality of the signal resulting in a seismic amplitude map where fluid and lithology variations are not clearly visible. FIG. 12 again shows the same seismic amplitude map of FIG. 11 with increasing reference numerals between 1210-1240 indicating increasing seismic amplitudes, with a contour interval again of 0.02. For example, reference numeral 1210 indicates −0.1 seismic amplitude, reference numeral 1220 indicates −0.04 seismic amplitude. Similarly reference numeral 1230 indicates 0.00 seismic amplitude while reference numeral 1240 indicates 0.06 seismic amplitude.

Figure 13:
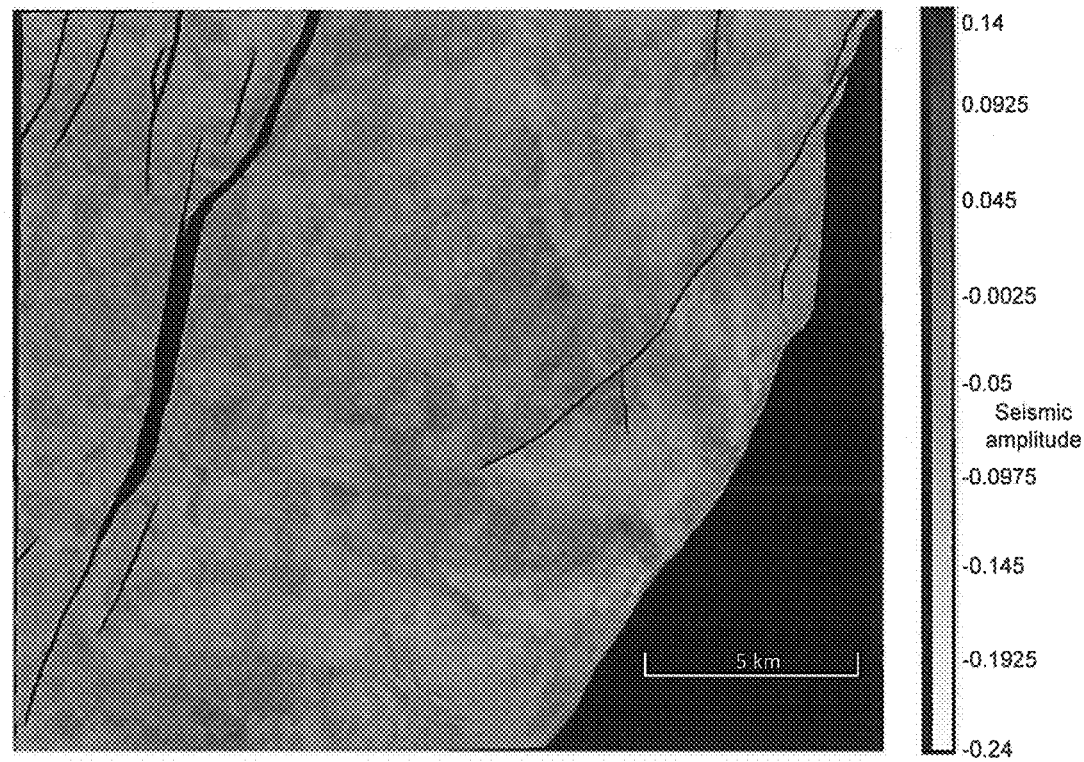
FIG. 13 shows a poorly un-optimized seismic amplitude map for an angle range of 10° to 23°.
Figure 14:
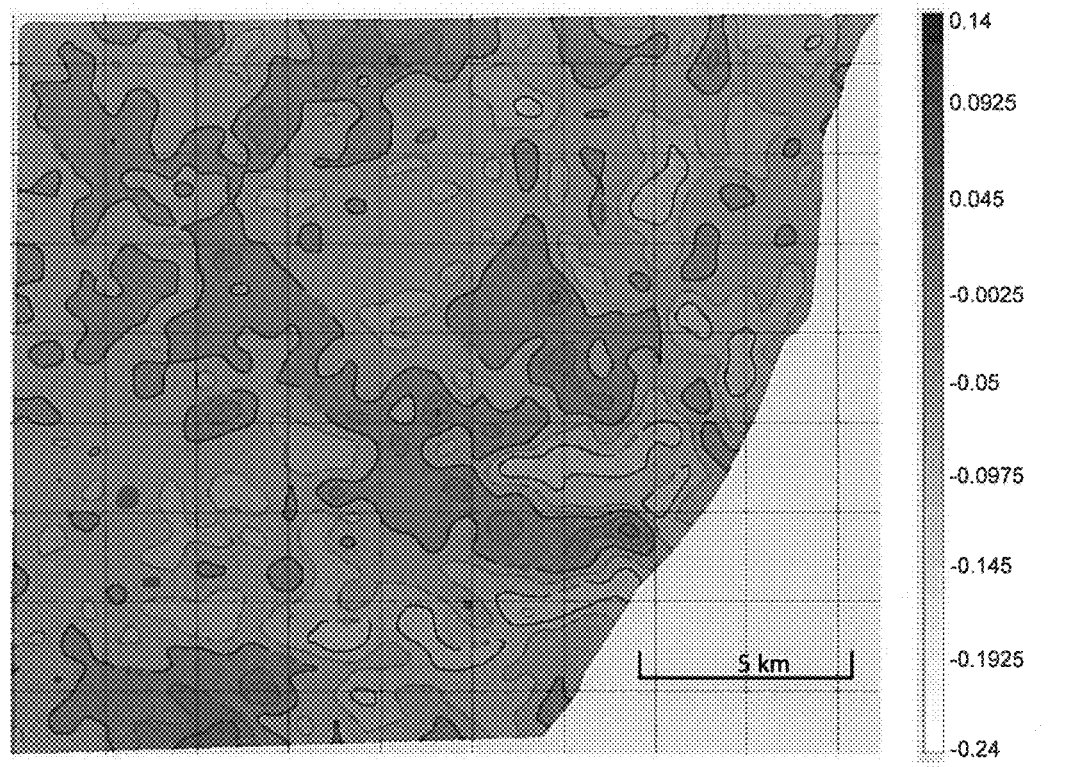
FIG. 14 shows contours superimposed on the poorly un-optimized seismic amplitude map of FIG. 13.

The maps of FIGS. 9 and 10, and FIGS. 11 and 12 are then to be compared with the maps of FIGS. 13 and 14, for which the very poor, un-optimized, angle stacks 10°-23° have been selected. It is obvious from this map, in comparison with the other maps, that no fluid or lithology is visible.

AVA Gradient-Intercept Graph

In another analysis process of the present disclosure, AVA curves, such as those shown in FIGS. 5 to 7, can be used to produce an AVA gradient-intercept graph, where the intercept values are obtained from extrapolating each of the AVA curves shown in FIGS. 5 to 7 to the zero angle. These intercept values are then plotted against the gradient. The production of such an AVA gradient-intercept graph is an example where AVA seismic datasets obtained from areas of interest may be used to characterize porosity variations within the subsurface. Use of robust and stable AVA curves obtained from the present disclosure may improve the accuracy and reliability of AVA class determinations in an area of interest.

The trend of the data points in AVA gradient-intercept graphs as described above may then be used to infer variations in the porosity of the particular area of interest. For example, the gradient-intercept graph produced as described above may be divided into specific AVA classes, for example AVA Class I to IV, depending on the gradient and the intercept values (i.e. representative of the acoustic impedance and which are computed from the AVA curves). AVA Class I is commonly associated with a positive impedance contrast and negative gradient, indicating a low porosity rock. AVA Class II is usually defined as having a negative gradient and small acoustic impedance (positive or negative, but near zero) representing an intermediate porosity. This contrasts with AVA Class III that is commonly associated with higher porosity, a moderate negative impedance and a more negative gradient. Highly porous rock is usually associated with AVA Class IV, which is usually considered to have a positive gradient and large negative acoustic impedance.

By plotting the AVA Classes against depth, as a further step, a user can make further inferences about the variation of porosity with depth for various geological layers in the area of interest, and in turn the geological processes that contributed to their formation (e.g., digenesis). For example, loose (i.e. unconsolidated) sand located at shallow depths will commonly be associated with a higher porosity (AVA Class IV). In comparison, sandstone located at greater depths has undergone either physical, chemical or biological change, for example, the pore spaces are filled with deposited minerals. These processes result in a lower porosity (AVA Class I). A person skilled in the art will appreciate that the use of more seismic trace locations allows for better delineation of an interface between two or more geological layers of different porosity, improved determination of vertical rock property trends and depth of an interface between various geological layers. It will thus be appreciated that the use of a large number of seismic trace locations and the processing thereof from the generated AVA curves is to lead to improved analysis of geological features.

The exemplary uses and benefits disclosed above are not meant to be limiting. One skilled in the art will appreciate that there are a number of other potential uses for the method and system as herein described. For example, in yet another embodiment, AVA curves generated in one of the methods previously described may be combined with information from an existing well and then be used as a reference for the current prospect or as an analog for exploration in a different prospect with no well control. In another example, the previously described AVA Class versus depth graphs may be combined with information obtained at one or more analysis locations to determine lateral and vertical rock property trends within the subsurface. This method may be useful to predict the variations in subsurface rock properties in locations where analysis has not occurred.

This described method and system may also provide superior input for further data processing such as inversion for rock properties, including aiding in parameter setting for probabilistic AVO inversion (two-angle, three-angle and/or four-angle) or calculation of a gradient or pseudo-gradient. Additionally, the present disclosure can aid in assessing non-flat gathers, event picking, AVA class II events, or comparing amplitude gates vs. single sample measurements.

Figure 15:
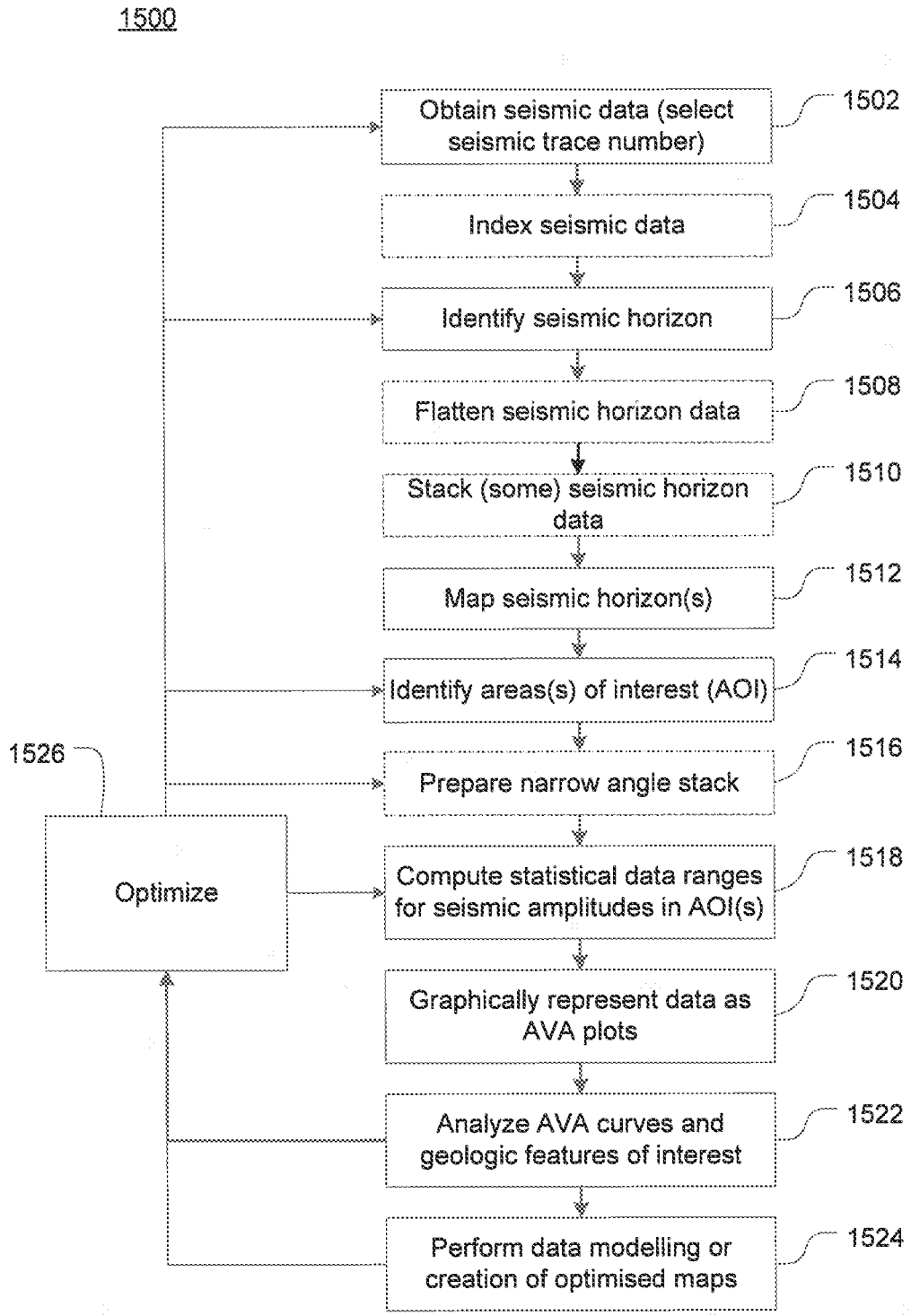
FIG. 15 shows a detailed flowchart illustrating a method for analyzing geologic features using seismic data in accordance with a further embodiment.

Turning to FIG. 15, a more detailed example embodiment of a method 1500 of analyzing geological features is shown. This method is similar to the method 300 described above but shows additional steps of the method, that may in certain circumstances be deemed optional, as well as steps relating to optimizing results. Also similar to the method 300, the method 1500 may but need not be performed by the particular system 200 of FIG. 2. However, in this embodiment of the invention, it is described to be performed by the system 200.

At operation 1502, seismic data containing seismic traces is obtained as a pre-stack seismic dataset from a data source or storage device. As part of this step, a number of seismic traces (such as a subset of data) can be selected by the seismic data module 206. These seismic traces may optionally be indexed (at operation 1504) in order to assist with the processing of data. Although indexing is indicated in FIG. 15 as a step following the selection of number of traces, it may in fact, in some embodiments be performed prior to the selection of a subset of seismic traces.

At operation 1506, information on seismic horizons is selected or identified by the seismic horizon module 208, which either receives a selection from a user or which selects a seismic horizon based on an analysis of the seismic traces. Data relating to the seismic horizons selected may be flattened thereby to remove the influence of geological processes in order to make interpretation of data easier. This is shown by operation 1508 and may, in one embodiment, be performed by the seismic horizon module 208.

At operation 1510, seismic amplitude data may be stacked as a group of angles by the stacking module 218, from which stacked data is generated as map (by the graphics generator module 212—see operation 1512) of the one or more seismic horizons. The map indicates, e.g., with colour, shading or contours, seismic amplitudes along a particular horizon, one example of which is shown in FIG. 4. This map is then used, in one example embodiment, as part of operation 1514 to identify one or more areas of interest on the seismic horizons. This step may typically be performed by the area of interest module 210, which, as described above, may either determine the one or more areas of interest or may receive a selection of such areas from a user through the user interface module 226.

At operation 1516, narrow angle stacks are created for the regions of interest, by the stacking module 218 mentioned above. Seismic traces within an area of interest for each time or depth sample at adjacent angles (e.g., 1-2°, 2-3°, 3-4°, etc.) are summed, possibly with a normalization based on the number of traces summed in order to obtain an optimum presentation of the results. This type of stacking is optional, and typically dependent on attributes of the seismic data.

The data is then used to compute statistical data ranges for the seismic amplitudes inside the one or more areas of interest as a function of the narrow angle stacks, as shown by operation 1518 and described in much detail above. The generated statistical data is then graphically represented as one or more AVA plots or curves, i.e. data ranges for seismic amplitudes as a function of angle (see operation 1520), by the plotting module 216. As mentioned above, the data ranges may, in one example embodiment, indicate the P20, P50 and P80 probabilistic values.

In one embodiment, the characteristics of the AVA curves and the data ranges are analyzed (see operation 1522) in order to monitor the quality of the seismic data during seismic data processing. For example, and as already mentioned, the P50 probabilistic values can be used to assess the quality of the signal, while variations between the P20 and P80 data ranges for each angle (or angle stack) can be used to assess the noise.

If, in analyzing the quality of data, it is determined as possible or necessary to improve the quality of the seismic data, optimization of the data (and process) could be initialized. For example, and as shown by operation 1526, the number of seismic traces may be altered by starting the process again from operation 1502 thereby potentially to obtain a smooth or smoother distribution of P50 probabilistic values that indicates statistically stable data. The number of seismic traces can also be altered to minimize the overlap of data ranges to obtain statistically distinct data for each seismic event. Alternatively, or additionally, the seismic data, and potentially the number of seismic traces, may also be altered by varying, e.g., the shape and size, or location, of the areas of interest, (previously described as polygons) as selected in step 1514.

An analysis of the characteristics of the AVA curves may also lead to the selection of a new and different seismic horizon (operation 1506). A determination may also be made to change the attributes of narrow angle stacking, as shown in operation 1516. For example, it may be determined that more, less angles or no angles should be stacked prior to computing the statistical data ranges. As mentioned above, it may also be determined that other probabilistic values (such as P30 or P70, or P10 and P90) may be used in the calculation of statistical data ranges for seismic amplitudes, as is shown in operation 1518.

Seismic data is routinely processed through many processing steps in order mostly to reduce noise in the data and/or to flatten the gathers. After each processing step, embodiments herein described may be used to monitor the signal as well as the noise, and specifically any variations therein. This is typically done by comparing angle vs amplitude plots (AVA curves) graphically produced by operation 1520 from one step to the previous step, (mentioned above as the analysis operation 1522).

In general, the aim of analysis and further processing is to maintain the signal (i.e. ensuring there is little or no change in the P50 values) and to reduce the noise (i.e. ensuring that the range bars decrease from one processing step to the next). It follows that a poor processing step may result in the AVA plot showing an impact to the signal, e.g., a variation in the P50 value, whereas the aim of the particular processing step was to reduce the noise. Also, processing steps aimed at gather flattening may inadvertently result in some gathers becoming less flat, which is also indicative of a poor processing step. Noise reduction may also be less than what was aimed for, which would potentially result in further changes being made to processing parameters in the noise reduction and a repeat of the relevant steps to generate an AVA graph and to analyze the graph.

Processing steps performed on seismic data in order to improve the signal (and reduce noise) may typically include, by way of non-limiting example, multiple attenuation, residual multiple attenuation, linear noise removal, removal of the effects of normal-moveout (NMO) stretch, gather flattening and/or random noise attenuation.

The embodiments herein described find best application to seismic data after seismic migration, with measurements being along a seismic event. Prior to seismic migration gathers are generally not very flat and may be impacted by severe noise. After migration gathers are generally flat and the worst of the noise has been eliminated, although multiple processing steps are typically still needed prior to interpretation of the data, as has been described above.

Once the seismic data and processing steps have been adjusted through optimization to enhance the quality of data, further analysis may be conducted on the data, in particular, on the generated AVA curves. Still at operation 1522, geologic features of interest are analyzed based on the plots created in operation 1520. This may include considering particular characteristics of the one or more curves or a relationship between the one or more curves, as described in much detail above. For example, the particular features of the one or more curves that may be monitored relate to zero-crossings, signal cross-over, the shape of one or more of the curves and features of the data ranges, e.g. whether curves have a sub-parallel association, whether P50 values remain smooth with a change in angle, amplitude standouts, and the lack of overlap between the statistical range bars.

As part of operation 1522, the particular features of the one or more curves may be used to optimize the narrow angle stacks into one or more of narrow bands of "nears", "mids" and "fars", i.e., narrow bands representing short, intermediate and long source-receiver offsets, thereby to maximize seismic amplitudes. This has been described with relation to FIG. 8 above.

Finally, at operation 1524, the optimized and non-standard narrow bands of "nears", "mids" and "fars" angle stacks may be used to do data modelling or to create optimized maps, graphs or the like. For example, the optimized maps may be optimized seismic amplitude maps, one example of which is shown in FIGS. 9 and 10. This step may be performed by the graphics generator module 212. These optimized maps can be used to monitor changes in channel morphology in order to assess the distribution of fluids and yield information about structural changes in the subsurface (e.g. faulting).

In another embodiment, the operation 1524 may involve the reading and assessment of time horizons, depth horizons, seismic gathers or seismic amplitude maps, either singularly or concurrently. AVA curves for a chosen area of interest can then be produced and displayed with the associated seismic gathers and seismic horizons. Vertical slices for any angle range or vertical slice movies at any angle increment may also be made. This method may increase the signal to noise ratio and improve the identification and evaluation of hydrocarbons and geological features within the subsurface.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. In addition, it should be appreciated that structural features or method steps shown or described in any one embodiment herein can be used in other embodiments as well.

The invention claimed is:

1. A computer-implemented method for analyzing geologic features of interest using pre-stack seismic data, the method including:
   a. receiving multiple pre-stack seismic datasets of seismic data representative of a subsurface volume of interest acquired from different seismic receiver-source pairs, the seismic data comprising seismic amplitudes and corresponding angles of incidence;
   b. obtaining one or more seismic horizons selected within a pre-stack seismic dataset, wherein the pre-stack seismic dataset includes a seismic amplitude and either: (i) an offset between a seismic receiver and a seismic source or (ii) an angle axis of reflection at a subsurface point;
   c. identifying one or more areas of interest on the one or more seismic horizons;
   d. computing statistical data ranges for seismic amplitudes inside the one or more areas of interest as a function of the offset or the angle axis;
   e. presenting, to a user interface, one or more plots of the statistical data ranges for seismic amplitudes as a function of the offset or the angle axis; and
   f. graphically distinguishing, in the one or more plots, geologic features of the subsurface of the one or more areas of interest based on the statistical data ranges for seismic amplitudes to graphically identify fluid features and lithology features located in the seismic dataset and conduct fluid estimation, lithology discrimination and/or analysis, structural conformance, well-planning and/or reservoir management.

2. The method of claim 1 further including, prior to the computing statistical data ranges, forming adjacent angle stacks by summing seismic data for each time or depth sample at two or more adjacent angles.

3. The method of claim 1 wherein seismic trace locations are used in the computation of the statistical data ranges and wherein the number of seismic trace locations used is determined to increase a statistical significance of the seismic amplitudes within the statistical data ranges.

4. The method of claim 1 wherein the statistical data ranges are represented by a P50 probabilistic value, an upper probabilistic value for the seismic amplitudes within a statistical data range, and a lower probabilistic value for the seismic amplitudes within the statistical data range, wherein a difference between the upper probabilistic value and the P50 value is the same as a difference between the lower probabilistic value and the P50 value.

5. The method of claim 1 wherein the statistical data ranges are represented by one or more of a probabilistic value, an average, mean, mode, or standard deviation for seismic amplitudes inside each of the one or more areas of interest.

6. The method of claim 1 further including, prior to determining geologic features from the plots, repeating one or more of steps b), c) and d), and monitoring the effect of the seismic processing on the generated plots in order to assess the quality of the seismic data.

7. The method of claim 6, further comprising varying the number of seismic trace locations in the seismic data.

8. The method of claim 7 wherein varying the number of seismic trace locations in the seismic data includes varying one or more of the shape, size, and location of the one or more areas of interest.

9. The method of claim 6, further comprising computing different statistical data ranges for the seismic amplitudes inside each of the one or more areas of interest.

10. The method of claim 6, further comprising adjusting angle limits of any angle stacks thereby to improve signal-to-noise ratio of the seismic data.

11. The method of claim 1 wherein the plots of statistical data ranges for seismic amplitudes include one or more curves each of which is associated with a particular area of interest.

12. The method of claim 1 wherein the determination of the geologic features is based on particular characteristics of the one or more curves or a relationship between the one or more curves.

13. The method of claim 12 wherein the particular features of the one or more curves relate to zero-crossings, signal cross-over, amplitude standout, the shape of one or more of the curves and features of the respective statistical data ranges.

14. The method of claim 13 further including using the particular features of the one or more curves to group angles into one or more angle bands representing one or more source-receiver offsets.

15. The method of claim 14 wherein determining geologic features of interest include generating seismic amplitude maps based on the angle bands representing one or more source-receiver offsets to maximize seismic amplitudes.

16. The method of claim 14 further including generating seismic forward models of geologic characteristics within the subsurface using the angle bands.

17. The method of claim 14 further including using data from the angle bands to do further data modelling or to create maps or graphs.

18. The method of claim 1 wherein the one or more areas of interest are identified based on seismic amplitudes in the particular area of interest, which is indicative of the presence of fluids, gas, and lithology variations.

* * * * *